United States Patent
Hirosawa et al.

(10) Patent No.: US 9,328,743 B2
(45) Date of Patent: May 3, 2016

(54) PRESSURE EXCHANGER AND PERFORMANCE ADJUSTMENT METHOD OF PRESSURE EXCHANGER

(75) Inventors: Yoshifumi Hirosawa, Amagasaki (JP); Norihiro Teramoto, Amagasaki (JP); Akira Shouzaki, Amagasaki (JP)

(73) Assignee: Kubota Corporation, Osaka (JP)

( * ) Notice: Subject to any disclaimer, the term of this patent is extended or adjusted under 35 U.S.C. 154(b) by 305 days.

(21) Appl. No.: 13/979,250

(22) PCT Filed: Jan. 10, 2012

(86) PCT No.: PCT/JP2012/050253
§ 371 (c)(1),
(2), (4) Date: Jul. 11, 2013

(87) PCT Pub. No.: WO2012/096253
PCT Pub. Date: Jul. 19, 2012

(65) Prior Publication Data
US 2013/0294944 A1    Nov. 7, 2013

(30) Foreign Application Priority Data
Jan. 12, 2011    (JP) .................................. 2011-003650

(51) Int. Cl.
*F04F 13/00*    (2009.01)
*B01D 61/06*    (2006.01)

(52) U.S. Cl.
CPC ............... *F04F 13/00* (2013.01); *B01D 61/06* (2013.01); *B01D 2313/246* (2013.01)

(58) Field of Classification Search
CPC .. B01D 61/08; B01D 61/10; B01D 2313/246; B01D 61/06; F04F 13/00
See application file for complete search history.

(56) References Cited

U.S. PATENT DOCUMENTS

| | | | |
|---|---|---|---|
| 2,764,340 A * | 9/1956 | Boszormenyi et al. | ......... 417/64 |
| 6,537,035 B2 | 3/2003 | Shumway | |
| 6,540,487 B2 | 4/2003 | Polizos et al. | |
| 7,306,437 B2 | 12/2007 | Hauge | |
| 7,815,421 B2 | 10/2010 | Bross et al. | |
| 2007/0212231 A1* | 9/2007 | Bross et al. | ..................... 417/65 |
| 2009/0180903 A1 | 7/2009 | Martin et al. | |
| 2010/0196152 A1 | 8/2010 | Pique et al. | |
| 2015/0050167 A1* | 2/2015 | Hirosawa et al. | ............. 417/406 |

FOREIGN PATENT DOCUMENTS

| | | |
|---|---|---|
| CN | 200710056401 A | 7/2007 |
| WO | 99017028 A1 | 4/1999 |
| WO | 2009046429 A2 | 4/2009 |

* cited by examiner

Primary Examiner — Bryan Lettman
(74) *Attorney, Agent, or Firm* — The Webb Law Firm

(57) ABSTRACT

A pressure exchanger includes a rotator disposed with pressure transmission sections around a rotation axis. Each pressure transmission section is formed such that a first flow path and a second flow path are communicated with each other. A first lateral member is formed with: first fluid inflow paths guiding the first fluid to the first flow paths; second fluid outflow paths guiding, from the second flow paths, second fluid obtained after pressure exchange with the first fluid; second fluid inflow paths guiding the second fluid to the second flow paths; and first fluid outflow paths guiding, from the first flow paths, first fluid obtained after pressure exchange with the second fluid in the thickness direction. A second lateral member is rotatably sandwiching the rotator between the second lateral member and the first lateral member.

12 Claims, 13 Drawing Sheets

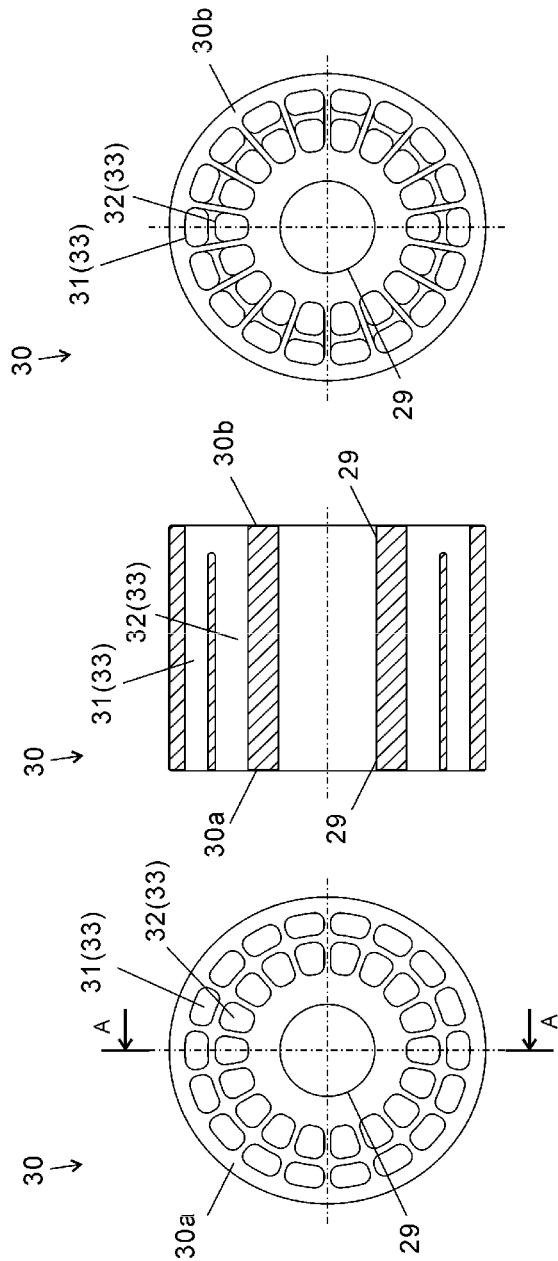

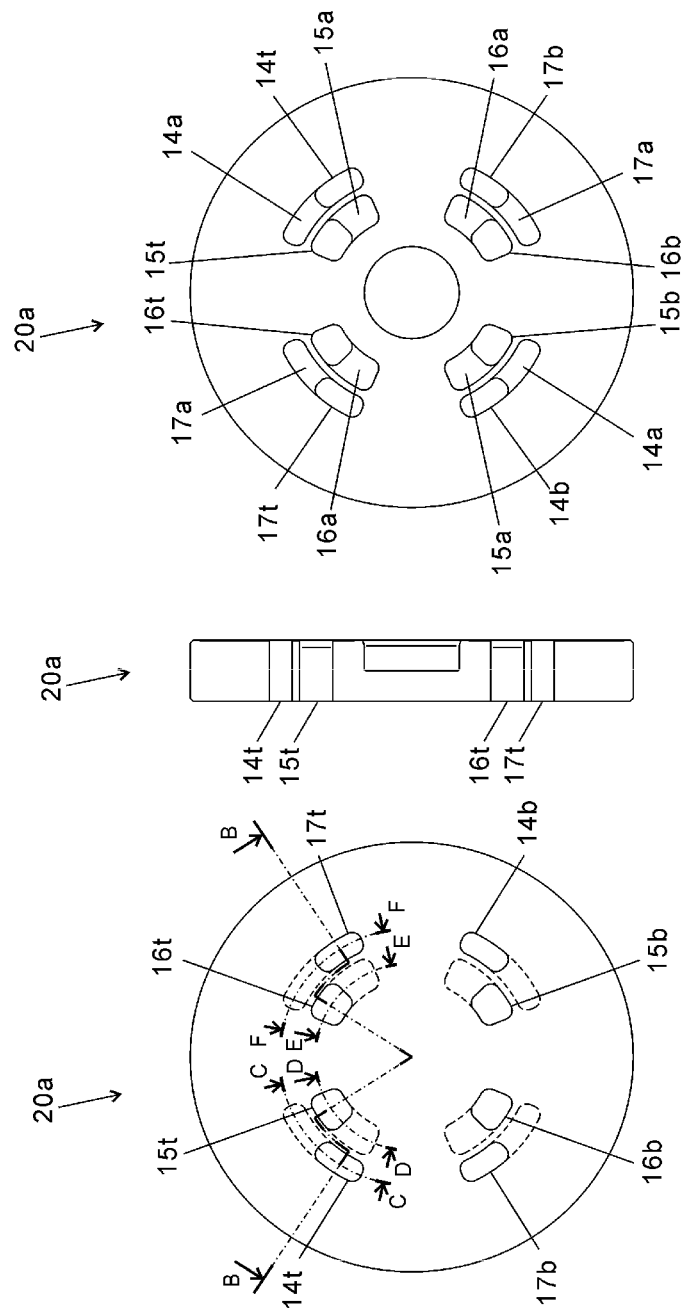

PRESSURE EXCHANGER AND PERFORMANCE ADJUSTMENT METHOD OF PRESSURE EXCHANGER

CROSS-REFERENCE TO RELATED APPLICATIONS

This application is the United States national phase under 35 U.S.C. §371 of International Application No. PCT/JP2012/050253 filed Jan. 10, 2012, entitled "Pressure Exchanger and Performance Adjustment Method of Pressure Exchanger", and claims priority under 35 U.S.C. §119(a)-(d) to Japanese Patent Application No. 2011-003650 filed on Jan. 12, 2011 in the Japanese Intellectual Property Office, the disclosures of which are hereby incorporated by reference in their entirety.

TECHNICAL FIELD

The present invention relates to a pressure exchanger for exchanging pressure between first fluid and second fluid, and to a performance adjustment method of the pressure exchanger.

BACKGROUND ART

A seawater desalination facility including a reverse osmosis membrane device is provided with a pressure exchanger that utilizes pressure of high pressure concentrated seawater discharged from the reverse osmosis membrane device to pressurize low pressure seawater supplied to the reverse osmosis membrane device.

As shown in FIG. 12, Patent Document 1 describes a pressure exchanger including a rotor 80 that is provided with a plurality of tubular pressure transmission sections around a rotation axis.

This pressure exchanger causes high pressure concentrated seawater supplied to a high pressure inlet port 82 and low pressure seawater supplied to a low pressure inlet port 81 to be in contact with each other in the tubular pressure transmission sections as the rotor 80 rotates. The pressure exchanger discharges the low pressure seawater that is pressurized by pressure of the high pressure concentrated seawater in the pressure transmission sections through a high pressure outlet port 83 as high pressure seawater. The pressure exchanger further discharges the high pressure concentrated seawater after pressure transmission as low pressure concentrated seawater by means of the low pressure seawater supplied to the low pressure inlet port 81 through a low pressure outlet port 84.

As shown in FIG. 13, Patent Document 2 describes a pressure exchanger including a rotator 90 that has a pair of rotor plates 91 and 92 and a shaft 93 connecting the rotor plates 91 and 92, and tubular pressure transmission sections 96.

The first rotor plate 91 is provided with a flow path 91a for guiding low pressure seawater supplied to a low pressure inlet port 95 to the pressure transmission section 96, and a flow path 91b for guiding high pressure seawater discharged from the pressure transmission section 96 to a high pressure outlet port 97.

The second rotor plate 92 is provided with a flow path 92b for guiding high pressure concentrated seawater supplied to a high pressure inlet port 94 to the pressure transmission section 96, and a flow path 92a for guiding low pressure concentrated seawater discharged from the pressure transmission section 96 to a low pressure outlet port 98.

This pressure exchanger causes the high pressure concentrated seawater supplied to the high pressure inlet port 94 and the low pressure seawater supplied to the low pressure inlet port 95 to be in contact with each other in the tubular pressure transmission sections 96 for pressure exchange as the rotor 90 rotates.

The pressure exchanger discharges the low pressure seawater that is pressurized by pressure of the high pressure concentrated seawater in the pressure transmission sections 96 through the high pressure outlet port 97 as high pressure seawater. The pressure exchanger further discharges the low pressure concentrated seawater after pressure transmission by means of the low pressure seawater supplied to the low pressure inlet port 95 through the low pressure outlet port 98.

PRIOR ART DOCUMENTS

Patent Documents

[Patent Document 1] US2009180903 (A1)
[Patent Document 2] CN200710056401

SUMMARY OF INVENTION

Problems to be Solved by the Invention

In the pressure exchanger described in Patent Document 1, a treated flow rate subject to pressure transmission is determined dependently on sectional areas of the tubular pressure transmission sections provided to the rotor 80. In order to increase the treated flow rate, it is necessary to increase the number of the provided pressure transmission sections or increase the sectional area of each of the pressure transmission sections. In any of these cases, the rotor 80 is increased in size, which leads to increase in size of the pressure exchanger as well as increase in weight thereof.

In general, the rotor 80 is made of an expensive material like ceramics in order to satisfy conditions such as reduction in weight, high rigidity, abrasion resistance, and a low friction coefficient. If the pressure exchanger is increased in size, there arises a problem of increase in cost for the material and production.

Furthermore, torque required for rotating such a large rotor 80 is also increased and more energy is necessary as compared with a case of rotating a small rotor 80, thereby to deteriorate efficiency. For these reasons, it has been quite difficult to increase the treated flow rate for one pressure exchanger.

A large seawater desalination facility for desalinating a large amount of seawater has been thus provided with a large number of pressure exchangers. Such a larger number of installed pressure exchangers leads to increase in piping connected to each of the pressure exchangers. There has been a problem of complicated construction work and maintenance work.

In the pressure exchanger described in Patent Document 2, the flow path 91b provided in the first rotor plate 91 and the flow path 92b provided in the second rotor plate 92 are communicated with a flow path section provided in the rotor plate along the axis and a flow path section provided in the rotor plate along the circumferential direction. The rotor plates 91 and 92 need to be thick enough to be provided with the flow paths. Accordingly, there have been problems that the rotor plates 91 and 92 are increased in size and the costs for the material and processing are increased.

Furthermore, if the rotor plates 91 and 92 are increased in weight due to increase in size, larger torsion or bending stress is applied to the shaft 93 when the rotator 90 rotates. The shaft 93 thus needs to be thickened in order to prevent deformation or damage of the rotator 90, as well as energy required for rotation is increased to deteriorate pressure exchange efficiency.

It is an object of the present invention to provide a pressure exchanger and a performance adjustment method of the pressure exchanger, which can realize reduction in size and cost without decreasing a treated flow rate.

Means for Solving the Problems

In order to achieve the object mentioned above, a first characteristic configuration of a pressure exchanger according to the present invention corresponds to a pressure exchanger for exchanging pressure between first fluid and second fluid, the pressure exchanger including: a rotator having, around a rotation axis, a pressure transmission section provided such that a first flow path into or out of which the first fluid flows from a first end is communicated with a second flow path into or out of which the second fluid flows from the first end; a first lateral member provided, in a thickness direction, with a first fluid inflow path for guiding the first fluid to the first flow path, a second fluid outflow path for guiding the second fluid after pressure exchange with the first fluid from the second flow path, a second fluid inflow path for guiding the second fluid to the second flow path, and a first fluid outflow path for guiding the first fluid after pressure exchange with the second fluid from the first flow path; and a second lateral member rotatably sandwiching the rotator between the first lateral member and the second lateral member, with a retentive member being interposed therebetween.

In the above configuration, pressure of the first fluid guided to the first flow path from outside the device through the first fluid inflow path provided in the first lateral member is transmitted to the second fluid in the second flow path communicated with the first flow path. The second fluid thus pressurized is discharged to outside the device through the second fluid outflow path provided in the first lateral member.

Furthermore, pressure of the second fluid guided to the second flow path from outside the device through the second fluid inflow path provided in the first lateral member is transmitted to the first fluid in the first flow path communicated with the second flow path. The first fluid is discharged to outside the device through the first fluid outflow path provided in the first lateral member.

In this manner, the pressure transmission section is configured by the first flow path, the second flow path, and a communication section between these flow paths. The first fluid or the second fluid can flow into the pressure transmission section from the first end of the rotator, the pressure can be exchanged between the first fluid and the second fluid, and the second fluid or the first fluid can flow out of the first end.

As compared with the pressure transmission section configured by a straight pipe as described in Patent Document 1, the rotator has a shorter axial length when performing pressure exchange treatment at a same flow rate, thereby to achieve reduction in size and cost of the device. Even if the flow rate of the pressure exchange treatment needs to be increased, such a shorter axial length of the rotator prevents extreme increase in size of the device.

Furthermore, the first fluid inflow and outflow paths and the second fluid inflow and outflow paths are provided only in the first lateral member, so that piping connected with the inflow path or the outflow path of each fluid can be provided in the first lateral member. As compared with the conventional device in which piping connected with the inflow path or the outflow path of fluid is provided at each end of the rotator, workability of piping installation work, maintenance work, and the like are improved.

In other words, the piping is collectively provided in the first lateral member, so that the installation space for the pressure exchanger including the piping is reduced. Furthermore, without removing the piping from the pressure exchanger, maintenance work of the pressure exchanger can be performed from the side of the second lateral member 20b provided with no piping. This improves maintenance performance.

In a second characteristic configuration, in addition to the first characteristic configuration, the rotator is accommodated in a space defined by the first and second lateral members, and the retentive member sandwiched between the lateral members, the first flow path and the second flow path are provided to pass through the rotator, and gaps into which the first fluid and the second fluid flow are provided between the rotator and the first and second lateral members, respectively.

The rotator rotates in the space defined by the first lateral member, the second lateral member, and the retentive member, the second fluid to which pressure is transmitted from the first fluid having flown into the first flow path flows out of the second flow path, and the first fluid to which pressure is transmitted from the second fluid having flown into the second flow path flows out of the first flow path, repeatedly.

In this case, the first flow path and the second flow path are provided to pass through the rotator, so that the first or second fluid flows into the gap provided between the end surface of the rotator and the second lateral member. This fluid applies force to press the rotator toward the first lateral member. Furthermore, the first fluid flowing from the first fluid inflow path or the second fluid flowing from the second fluid inflow path provided in the first lateral member flows into the gap provided between the end surface of the rotator and the first lateral member. This fluid applies force to press the rotator toward the second lateral member.

The rotator thus pressed by such nearly equal force from each of the ends is not deviated in either direction between the first lateral member and the second lateral member. The rotator can rotate smoothly without constantly sliding with either one of the first lateral member and the second lateral member. The fluid flowing in each of the gaps also serves as a lubricant. As a result, the rotator, the first lateral member, and the second lateral member are less likely to be abraded, and it is possible to improve durability even if the rotator and the lateral members are not made of an expensive material having abrasion resistance.

The rotator is pressed by nearly equal force from each of the ends. This reduces sliding resistance between the first and second lateral members and the rotator. Accordingly, even when the rotator is formed to have a large diameter and the sectional areas of the first and second flow paths configuring the pressure transmission section are increased in order to increase the treated flow rate, it is possible to reduce loss of energy required for driving to rotate the rotator.

If the gaps provided between the rotator and the first and second lateral members are too small, large sliding resistance is generated. On the other hand, if the gaps are too large, the flow rate of the lubricant fluid increases to deteriorate pressure exchange efficiency. The gaps are thus preferably about 1 to 100 µm wide.

In addition to the second characteristic configuration, a third characteristic configuration is that a press mechanism for pressing at least one of the lateral members to adjust a distance between the first and second lateral members.

In the above configuration, even when the lateral members and the end surfaces of the rotator are abraded to increase the gaps and the fluid leaks to deteriorate pressure exchange efficiency, the press mechanism is capable of adjusting the distance between the first and second lateral members. Accordingly, main components such as the rotator need to be replaced less frequently.

In a fourth characteristic configuration, in addition to the second or third characteristic configuration, the first and second lateral members are provided outside thereof with press spaces pressing the lateral members toward the rotator, and the first and second lateral members are provided with continuous holes for guiding the fluid supplied to the first flow path or the second flow path into the press spaces.

The fluid guided into each of the press spaces through the continuous holes provided in the first and second lateral members applies force to press each of the first and second lateral members toward the rotator. The fluid guided into each of the press spaces has pressure nearly equal to the pressure of the fluid flowing into each of the gaps provided between the rotator and the first and second lateral members. In other words, the pressing force applied to each of the surfaces of the first and second lateral members is balanced. It is thus possible to prevent deformation of the first and second lateral members along the rotation axis due to the pressure of the fluid. The gaps between the rotator and the lateral members are not increased but kept to be in predetermined sizes during operation. Furthermore, the rotator can rotate smoothly without sliding with the first lateral member and the second lateral member.

In a fifth characteristic configuration, in addition to any one of the first to fourth characteristic configurations, the first lateral member includes a torque application mechanism for applying torque to the rotator with use of energy of the first fluid flowing into the first flow path or flowing out of the first flow path, or energy of the second fluid flowing into the second flow path or flowing out of the second flow path.

In the above configuration, the energy of the first fluid flowing into the first flow path or flowing out of the first flow path, or the energy of the second fluid flowing into the second flow path or flowing out of the second flow path is converted to torque for rotating the rotator by the torque application mechanism provided to the first lateral member. It is thus possible to rotate the rotator with no need of external power. Furthermore, rotation of the rotator switches between flowing in and flowing out of the first fluid as well as flowing in and flowing out of the second fluid with respect to the pressure transmission section, with no need of any additional flow path switch mechanism.

Out of the first fluid flowing into the first flow path or flowing out of the first flow path and the second fluid flowing into the second flow path or flowing out of the second flow path, the energy of the fluid flowing into the flow path that is more distant radially from the rotation axis or the energy of the fluid flowing out of the flow path that is more distant radially from the rotation axis is preferably utilized to improve energy efficiency, because larger torque can be generated with use of the equal energy.

In a sixth characteristic configuration, in addition to the fifth characteristic configuration, the torque application mechanism includes: a first inclined section provided on a surface of the first fluid inflow path opposite to the rotator, so as to be circumferentially expanded and communicated with a plurality of first flow paths along a circumferential direction of the rotator; and a second inclined section provided on a surface of the second fluid outflow path opposite to the rotator, so as to be circumferentially expanded and communicated with a plurality of second flow paths along the circumferential direction of the rotator; and the first inclined section and the second inclined section are inclined inversely to each other.

The first inclined section is provided on the surface of the first fluid inflow path opposite to the rotator, so as to be circumferentially expanded and communicated with the plurality of first flow paths along the circumferential direction of the rotator. The first fluid thus flows from the first fluid inflow path along the first inclined section dispersedly into the plurality of first flow paths.

The first fluid flowing along the first inclined section flows along the circumferential direction of the rotator and applies pressure to wall surfaces of the first flow paths. In other words, applied is torque for rotating the rotator.

The second inclined section is provided on the surface of the second fluid outflow path opposite to the rotator, so as to be circumferentially expanded and communicated with the plurality of second flow paths along the circumferential direction of the rotator. The second fluid flowing in the plurality of second flow paths thus joins together, and flows along the second inclined section to the second fluid outflow path.

The second fluid flowing along the second inclined section to the second fluid outflow path applies pressure to wall surfaces of the second flow paths so as to increase sectional areas of water flowing from the second flow paths to the second fluid outflow path. In other words, circumferential torque is applied to the rotator.

The first inclined section and the second inclined section are provided so as to be inclined inversely to each other. Accordingly, the torque applied to the rotator by the first fluid is directed identically with the torque applied to the rotator by the second fluid.

In other words, each of the energy of the first fluid flowing into the rotator and the energy of the second fluid flowing out of the rotator generates torque for rotating the rotator in the identical direction. It is thus possible to apply torque larger than that in a case of rotating the rotator with use only of either energy.

In a seventh characteristic configuration, in addition to any one of the first to sixth characteristic configurations, the rotator is provided with a plurality of pressure transmission sections radially around the rotation axis.

In the above configuration, the plurality of pressure transmission sections are provided radially around the rotation axis. This increases the total sectional areas of the flow paths so as to increase the flow rate treated by the pressure exchanger.

In an eighth characteristic configuration, in addition to the seventh characteristic configuration, the plurality of adjacent pressure transmission sections are communicated simultaneously with at least each one of the first fluid inflow path and the second fluid outflow path, or each one of the second fluid inflow path and the first fluid outflow path, as the rotator rotates.

In the above configuration, the plurality of pressure transmission sections circumferentially adjacent to each other are communicated simultaneously with at least each one of the first fluid inflow path and the second fluid outflow path, or each one of the second fluid inflow path and the first fluid outflow path, as the rotator rotates. It is thus possible to reduce change in flow rate of the first fluid or the second fluid due to rotation of the rotator, so as to prevent bad influence such as pulsation of the fluid or vibration of the device.

In a ninth characteristic configuration, in addition to the seventh or eighth characteristic configuration, at least one of the plurality of pressure transmission sections is not communicated with the first fluid inflow path and the second fluid outflow path, and with the first fluid outflow path and the second fluid inflow path, as the rotator rotates.

In the above configuration, out of the plurality of pressure transmission sections, the pressure transmission section, which is not communicated with the first fluid inflow path and the second fluid outflow path, and with the first fluid outflow path and the second fluid inflow path, as the rotator rotates, is capable of temporarily stopping flowing in and flowing out of the first fluid and the second fluid. It is thus possible to smoothly switch the direction of the fluid flowing in the first flow path and the second flow path.

Furthermore, it is possible to increase the distance between "the first fluid inflow path and the second fluid outflow path" through which high pressure fluid flows and "the first fluid outflow path and the second fluid inflow path" through which low pressure fluid flows. The flow rate of the lubricant fluid can be thus minimized to improve pressure transmission efficiency.

In a tenth characteristic configuration, in addition to any one of the first to ninth characteristic configurations, the first lateral member is provided with a plurality of sets of first fluid inflow paths and second fluid outflow paths so as to be symmetrical around the rotation axis.

In the above configuration, the fluid flows into and out of the rotator for a plurality of times while the rotator rotates once. The travel distance of the fluid by flowing in once or flowing out once is decreased and the flow path can be reduced in length, which leads to reduction in size of the rotator.

The first lateral member is provided with the plurality of sets of the first fluid inflow paths and the second fluid outflow paths so as to be symmetrical around the rotation axis. The torque application mechanism can be thus provided so as to be symmetrical around the rotation axis. Accordingly, the rotator receives torque well balanced about the rotation axis to rotate smoothly with no inclination of the rotation axis.

In an eleventh characteristic configuration, in addition to any one of the first to tenth characteristic configurations, the first flow path and the second flow path have equal sectional areas.

In the above configuration, the first flow path and the second flow path are provided to have the equal sectional areas. Accordingly, pressure loss is reduced when the fluid flows through each of the first flow path and the second flow path, thereby to achieve pressure transmission with high pressure exchange efficiency.

In a twelfth characteristic configuration, in addition to any one of the first to eleventh characteristic configurations, the rotator is coupled with a drive shaft for rotating the rotator with use of external power.

In the above configuration, even in a case where the rotator is not rotated stably for a reason such as an inconstant flow of the fluid, the external power of a driving machine or the like coupled to the drive shaft can rotate the rotator and achieve stable pressure exchange treatment.

In a thirteenth characteristic configuration, in addition to any one of the first to twelfth characteristic configurations, the first fluid supplied to the first fluid inflow path corresponds to high pressure concentrated fluid discharged from a reverse osmosis membrane device, and the second fluid supplied to the second fluid inflow path corresponds to concentration target fluid supplied to the reverse osmosis membrane device.

In the above configuration, pressure of the high pressure concentrated fluid discharged from the reverse osmosis membrane device can pressurize the concentration target fluid supplied to the reverse osmosis membrane device. It is thus possible to utilize excessive pressure of the high pressure concentrated fluid from the reverse osmosis membrane device as available energy without discarding.

A characteristic configuration of a performance adjustment method of a pressure exchanger according to the present invention corresponds to a performance adjustment method of the pressure exchanger having the fifth or sixth characteristic configuration, and the method includes adjusting a treated flow rate by modifying the torque application mechanism.

When the shapes of the first inclined section and the second inclined section are changed, magnitude of a velocity component of the fluid that applies torque to the rotator is changed, thereby to change rotation speed of the rotator. In other words, the rotation speed of the rotator is dependent on the shapes of the first inclined section and the second inclined section. The rotation speed of the rotator can be changed in accordance with the treated flow rate only by changing the shapes of the first inclined section and the second inclined section. It is thus possible to easily adjust the treated flow rate of the pressure exchanger.

Effects of Invention

As described above, the present invention is capable of providing a pressure exchanger and a performance adjustment method of the pressure exchanger, which can realize reduction in size and cost without decreasing a treated flow rate.

BRIEF DESCRIPTION OF DRAWINGS

FIG. 3(a) is a front view of a rotator, FIG. 3(b) is a sectional view taken along line A-A in FIG. 3(a), and FIG. 3(c) is a rear view thereof.

FIG. 4(a) is a front view of a first lateral member, FIG. 4(b) is a sectional view taken along line B-B in FIG. 4(a), and FIG. 4(c) is a rear view thereof.

FIG. 5(a) is a sectional view taken along line C-C of a first fluid inflow path in FIG. 4(a) and showing first flow paths communicated with the first fluid inflow path, FIG. 5(b) is a sectional view taken along line D-D of a second fluid outflow path in FIG. 4(a) and showing second flow paths communicated with the second fluid outflow path, FIG. 5(c) is a sectional view taken along line F-F of a first fluid outflow path in FIG. 4(a) and showing first flow paths communicated with the first fluid outflow path, and FIG. 5(d) is a sectional view taken along line E-E of a second fluid inflow path in FIG. 4(a) and showing second flow paths communicated with the second fluid inflow path.

EMBODIMENTS FOR CARRYING OUT THE INVENTION

Described hereinafter are a pressure exchanger and a performance adjustment method of the pressure exchanger according to a preferred embodiment of the present invention.

Figure 1:
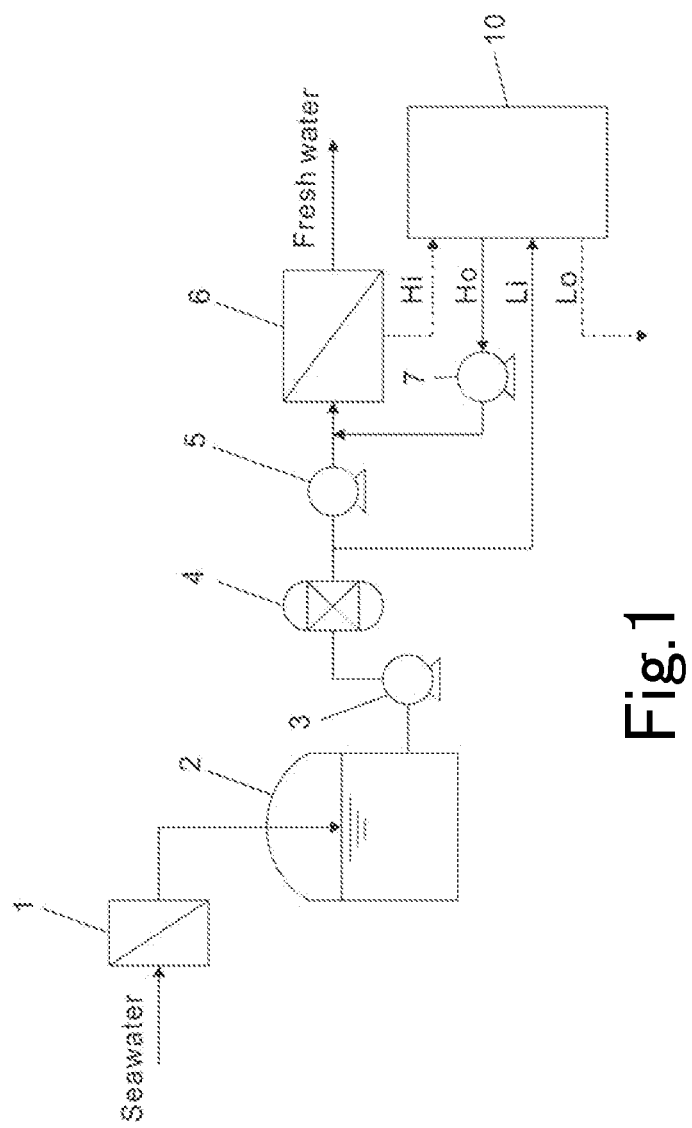
FIG. 1 is a schematic flow diagram of a seawater desalination facility.

As shown in FIG. 1, a seawater desalination facility includes a preliminary treatment unit 1 for removing impurities in seawater, a filtered seawater tank 2 for reserving seawater preliminarily treated by the preliminary treatment unit 1, a supply pump 3 for supplying the seawater reserved in the filtered seawater tank 2 to a safety filter 4, the safety filter 4 for removing minute foreign substances in the seawater in order to prevent clogging of a reverse osmosis membrane device 6, a high pressure pump 5 for pressurizing the seawater having passed through the safety filter 4, and the reverse osmosis membrane device 6 supplied with the pressurized seawater. The reverse osmosis membrane device 6 removes various salts in the seawater to obtain fresh water that can be utilized as drinking water, industrial water, and the like.

The reverse osmosis membrane device 6 pressurizes seawater located on a first side of a reverse osmosis membrane to exude fresh water not including various salts in the seawater on a second side of the reverse osmosis membrane. In order to obtain fresh water, it is necessary to pressurize seawater so as to have predetermined pressure not less than osmotic pressure.

The reverse osmosis membrane device 6 is incapable of entirely desalinating seawater supplied thereto. For example, 40% of the seawater supplied to the reverse osmosis membrane device 6 is desalinated and discharged, while remaining 60% of the seawater is not desalinated and discharged as high pressure concentrated seawater having quite high pressure.

There is thus provided a pressure exchanger 10 for recovering the pressure of the high pressure concentrated seawater discharged from the reverse osmosis membrane device 6 to be utilized as available energy.

The 40% of the seawater supplied from the filtered seawater tank 2 to the reverse osmosis membrane device 6 is pressurized by the high pressure pump 5 so as to have predetermined pressure not less than the osmotic pressure, such as 6.9 MPa. The remaining 60% of the seawater (hereinafter, referred to as "low pressure seawater") supplied to the reverse osmosis membrane device 6 is pressurized to have 6.9 MPa by excessive pressure (6.75 MPa) recovered by the pressure exchanger 10 from the high pressure concentrated seawater discharged from the reverse osmosis membrane device 6 as well as by a booster pump 7.

More specifically, the pressure exchanger 10 performs pressure exchange treatment including pressurizing low pressure seawater Li as concentration target fluid with use of pressure of high pressure concentrated seawater Hi discharged from the reverse osmosis membrane device 6 and supplying the pressurized seawater as high pressure seawater Ho to the reverse osmosis membrane device 6 by way of the booster pump 7, as well as discharging low pressure concentrated seawater Lo obtained by recovering the pressure to the low pressure seawater Li supplied to the pressure exchanger 10. In the present embodiment, the high pressure concentrated seawater Hi and the low pressure concentrated seawater Lo each serve as first fluid, whereas the low pressure seawater Li and the high pressure seawater Ho each serve as second fluid.

In this manner, the pressure exchanger 10 does not discard but utilizes the pressure of the high pressure concentrated seawater Hi discharged from the reverse osmosis membrane device 6 to pressurize the low pressure seawater Li supplied to the reverse osmosis membrane device 6 and partially supplements the pressure necessary for filtration by the reverse osmosis membrane device 6. This leads to increase in energy efficiency of the entire seawater desalination facility.

Figure 2:
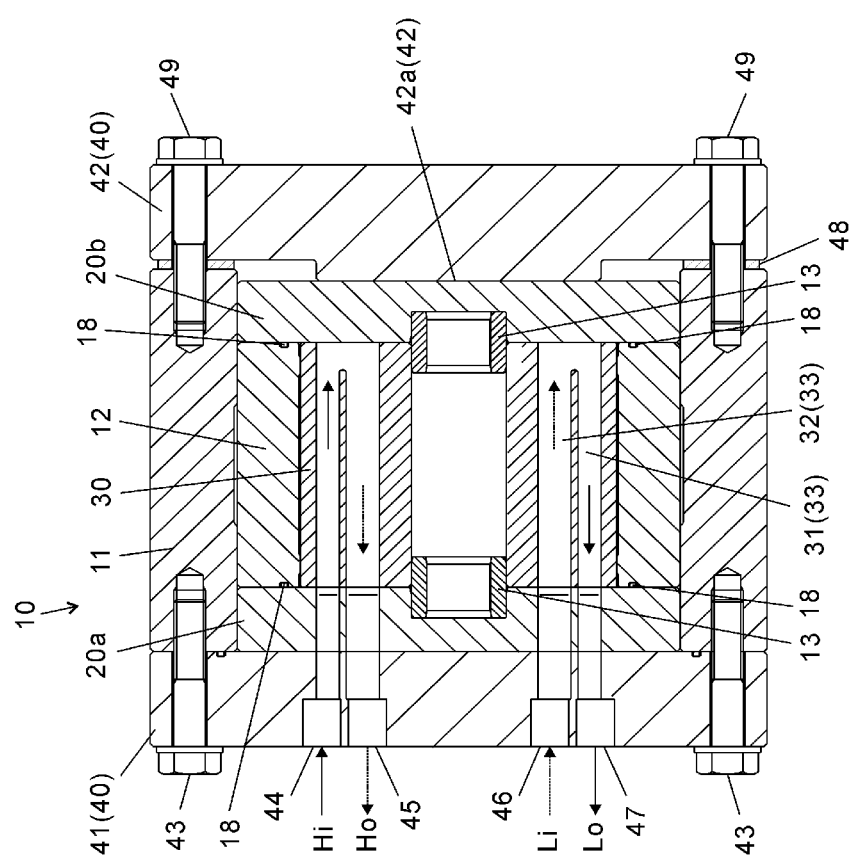
FIG. 2 is a sectional view illustrating a pressure exchanger.

As shown in FIG. 2, the pressure exchanger 10 includes a rotator 30 and a press mechanism 40. The rotator 30 is accommodated in a space defined by a casing 11, a first lateral member 20a, a second lateral member 20b, and a sleeve 12 sandwiched between the lateral members 20a and 20b, and is rotatably supported by bushes 13 that are provided respectively to the lateral members 20a and 20b.

The casing 11 can be made of a strong material having corrosion resistance to seawater, such as resin or metal like duplex stainless steel or super duplex stainless steel. The casing 11 can be alternatively configured by a highly strong metal pipe made of stainless steel or the like, which is coated with a resin material or ceramics. In this case, it is possible to reduce the cost by using inexpensive materials having less corrosion resistance.

The rotator 30, the lateral members 20a and 20b, and the sleeve 12 can be each made of a strong material having corrosion resistance to seawater, such as ceramics like alumina, FRP, duplex stainless steel, or super duplex stainless steel. When the duplex stainless steel or the super duplex stainless steel is used, surfaces of the rotator 30 and the lateral members 20a and 20b facing each other are preferably provided with abrasion resistant layers having a low friction coefficient, by nitriding, thermal spraying of ceramics such as alumina for buildup welding or applying HIP treatment.

A rotary shaft or rotation sliding surfaces of the rotator 30 need to be made of an expensive material such as ceramics having abrasion resistance and a low friction coefficient. However, provision of the bushes 13 as the rotary shaft minimizes the amount of such an expensive material and thus achieves reduction in cost.

As shown in FIGS. 2, 3(a), 3(b), and 3(c), the rotator 30 is provided with first flow paths 31 into which the high pressure concentrated seawater Hi flows from a first end surface 30a and out of which the low pressure concentrated seawater Lo after pressure exchange flows, and second flow paths 32 into which the low pressure seawater Li flows from the first end surface 30a and out of which the high pressure seawater Ho after pressure exchange flows. The first flow paths 31 and the second flow paths 32 are provided so as to be communicated with each other at a side of a second end surface 30b of the rotator 30, thereby to configure pressure transmission sections 33. The first flow paths 31 and the second flow paths 32 are provided so as to have equal sectional areas.

There are provided 18 pressure transmission sections 33 radially around a rotation axis, and the rotator 30 is provided at the center thereof with an opening 29 through which the bushes 13 can be inserted. In the present embodiment, the high pressure concentrated seawater Hi and the low pressure concentrated seawater Lo each serve as the first fluid, whereas the low pressure seawater Li and the high pressure seawater Ho each serve as the second fluid.

As shown in FIGS. 2, 4(a), 4(b), and 4(c), the first lateral member 20a is provided, in the thickness direction thereof, with first fluid inflow paths 14t and 14b, second fluid outflow paths 15t and 15b, second fluid inflow paths 16t and 16b, and first fluid outflow paths 17*t* and 17*b*. The first fluid inflow paths 14*t* and 14*b* guide the high pressure concentrated seawater Hi to the first flow paths 31 in the rotator 30. The second fluid outflow paths 15*t* and 15*b* guide the high pressure seawater Ho after pressure exchange with the high pressure concentrated seawater Hi from the second flow paths 32. The second fluid inflow paths 16*t* and 16*b* guide the low pressure seawater Li to the second flow paths 32. The first fluid outflow paths 17*t* and 17*b* guide the low pressure concentrated seawater Lo after pressure exchange with the low pressure seawater Li from the first flow paths 31.

As shown in FIG. 4(*a*), in the present embodiment, the first fluid inflow path 14*t* and the second fluid outflow path 15*t*, and the first fluid inflow path 14*b* and the second fluid outflow path 15*b*, are located so as to be point symmetrical with respect to the rotation axis when viewed along the rotation axis.

Furthermore, at positions displaced at 90 degrees from the flow paths 14*t*, 15*t*, 14*b*, and 15*b*, the second fluid inflow path 16*t* and the first fluid outflow path 17*t*, and the second fluid inflow path 16*b* and the first fluid outflow path 17*b*, are located so as to be point symmetrical with respect to the rotation axis when viewed along the rotation axis.

The first lateral member 20*a* is provided with a torque application mechanism for applying torque to the rotator 30 so as to rotate the rotator 30 with use of energy of the high pressure concentrated seawater Hi flowing into the first flow paths 31, energy of the high pressure seawater Ho flowing out of the second flow paths 32, energy of the low pressure seawater Li flowing into the second flow paths 32, and energy of the low pressure concentrated seawater Lo flowing out of the first flow paths 31.

There is thus no need of external power for rotating the rotator 30. Furthermore, rotation of the rotator 30 switches between flowing in and flowing out of the first fluid as well as flowing in and flowing out of the second fluid, with no need of any additional flow path switch mechanism.

As shown in FIGS. 4(*c*) and 5(*a*) to 5(*d*), the torque application mechanism is configured by inclined surfaces 14*a* as first inclined sections, inclined surfaces 15*a* as second inclined sections, inclined surfaces 16*a* as second inclined sections, and inclined surfaces 17*a* as first inclined sections.

The inclined surfaces 14*a* as the first inclined sections are provided at surfaces of the first fluid inflow paths 14*t* and 14*b* opposite to the rotator 30, so as to be circumferentially expanded and communicated with the plurality of first flow paths 31 along the circumferential direction of the rotator 30.

The inclined surfaces 15*a* as the second inclined sections are provided at surfaces of the second fluid outflow paths 15*t* and 15*b* opposite to the rotator 30, so as to be circumferentially expanded and communicated with the plurality of second flow paths 32 along the circumferential direction of the rotator 30.

The inclined surfaces 16*a* as the second inclined sections are provided at surfaces of the second fluid inflow paths 16*t* and 16*b* opposite to the rotator 30, so as to be circumferentially expanded and communicated with the plurality of second flow paths 32 along the circumferential direction of the rotator 30.

The inclined surfaces 17*a* as the first inclined sections are provided at surfaces of the first fluid outflow paths 17*t* and 17*b* opposite to the rotator 30, so as to be circumferentially expanded and communicated with the plurality of first flow paths 31 along the circumferential direction of the rotator 30.

The inclined surfaces 14*a* and the inclined surfaces 15*a* are provided so as to be inclined inversely to each other (see FIGS. 5(*a*) and 5(*b*)), and the inclined surfaces 16*a* and the inclined surfaces 17*a* are provided so as to be inclined inversely to each other (see FIGS. 5(*c*) and 5(*d*)).

The inclined surfaces 14*a* are provided at the surfaces of the first fluid inflow paths 14*t* and 14*b* opposite to the rotator 30, so as to be circumferentially expanded and communicated with the plurality of first flow paths 31 along the circumferential direction of the rotator 30. The high pressure concentrated seawater Hi thus flows from the first fluid inflow paths 14*t* and 14*b* along the inclined surfaces 14*a* dispersedly into the plurality of first flow paths 31.

The high pressure concentrated seawater Hi flowing along the inclined surfaces 14*a* flows along the circumferential direction of the rotator 30 and applies pressure to wall surfaces of the first flow paths 31. In other words, this pressure serves as torque for rotating the rotator 30. These inclined surfaces 14*a* partially serve as an example of the torque application mechanism.

The inclined surfaces 15*a* are provided at the surfaces of the second fluid outflow paths 15*t* and 15*b* opposite to the rotator 30, so as to be circumferentially expanded and communicated with the plurality of second flow paths 32 along the circumferential direction of the rotator 30. The high pressure seawater Ho flowing in the plurality of second flow paths 32 thus joins together, and flows along the inclined surfaces 15*a* to the second fluid outflow paths 15*t* and 15*b*.

The high pressure seawater Ho flowing along the second inclined sections 15*a* to the second fluid outflow paths 15*t* and 15*b* applies pressure to wall surfaces of the second flow paths 32 so as to increase sectional areas of water flowing from the second flow paths 32 to the second fluid outflow paths 15*t* and 15*b*. In other words, this pressure serves as torque for rotating the rotator 30.

The inclined surfaces 14*a* and the inclined surfaces 15*a* are provided so as to be inclined inversely to each other. Accordingly, the torque applied to the rotator 30 by the energy of the high pressure concentrated seawater Hi flowing from the first fluid inflow paths 14*t* and 14*b* to the first flow paths 31 is directed identically with the torque applied to the rotator 30 by the energy of the high pressure seawater Ho flowing from the second flow paths 32 to the second fluid outflow paths 15*t* and 15*b*.

In other words, the energy of the high pressure concentrated seawater Hi flowing into the rotator 30 and the energy of the high pressure seawater Ho flowing out of the rotator 30 generate torque for rotating the rotator 30. It is thus possible to apply torque larger than that of a case of rotating the rotator 30 with use only of the energy of either one of the high pressure concentrated seawater Hi or the high pressure seawater Ho.

Similarly, the torque applied to the rotator 30 by the energy of the low pressure seawater Li flowing from the second fluid inflow paths 16*t* and 16*b* into the second flow paths 32 is directed identically with the torque applied to the rotator 30 by the energy of the low pressure concentrated seawater Lo flowing from the first flow paths 31 to the first fluid outflow paths 17*t* and 17*b*.

In other words, the energy of the low pressure seawater Li flowing into the rotator 30 and the energy of the low pressure concentrated seawater Lo flowing out of the rotator 30 also generate torque for rotating the rotator 30. It is thus possible to apply torque still larger than that of a case of rotating the rotator 30 with use only of the energy of the high pressure concentrated seawater Hi and the energy of the high pressure seawater Ho.

As shown in FIG. 2, the first flow paths 31 and the second flow paths 32 are provided so as to pass through the rotator 30, and the end surfaces 30*a* and 30*b* of the rotator 30 have the same shapes. While the rotator 30 rotates in the space defined by the first lateral member 20a, the second lateral member 20b, and the sleeve 12 sandwiched between the lateral members 20a and 20b, the rotator 30 is pressed from both sides at predetermined pressure by the first fluid and the second fluid flowing into gaps provided between the rotator 30 and the first lateral member 20a and the second lateral member 20b, respectively, when the pressure transmission sections transmit pressure between the first fluid and the second fluid. The rotator 30 is thus located in the space with no deviation along the axis.

In other words, the rotator 30 is not pressed to any one of the lateral members 20a and 20b and can thus rotate smoothly with less resistance to rotation. Furthermore, the fluid flowing in each of the gaps serves as a lubricant to realize smoother rotation. Moreover, the rotator 30 is less likely to be abraded with the lateral members 20a and 20b and is thus improved in durability.

If the resistance to rotation of the rotator 30 can be reduced, the rotator can rotate smoothly even when the rotator is increased in diameter. Such increase in diameter of the rotator enables increase in sectional area of the flow paths provided in the rotator. This leads to improvement in treatment performance of the device with no deterioration in efficiency.

If the gaps are too small, the rotator 30 and the lateral members 20 slide with each other to generate resistance to rotation. On the other hand, if the gaps are too large, the flow rate of the lubricant fluid increases to deteriorate pressure exchange efficiency. The gaps are thus preferably about 1 to 100 μm wide.

The press mechanism 40 is capable of adjusting the gaps. There are provided seals 18 along the circumferences of surfaces of the sleeve 12 in contact with the first lateral member 20a and the second lateral member 20b. These seals 18 prevent leak of the fluid to outside the sleeve 12.

The press mechanism 40 includes a pressed member 41 and a pressing member 42. The pressed member 41 is provided close to the first lateral member 20a at a first end of the casing 11 located to surround the outer periphery of the sleeve 12. The pressing member 42 is located to be in contact with the second lateral member 20b at a second end of the casing 11.

Figure 7:
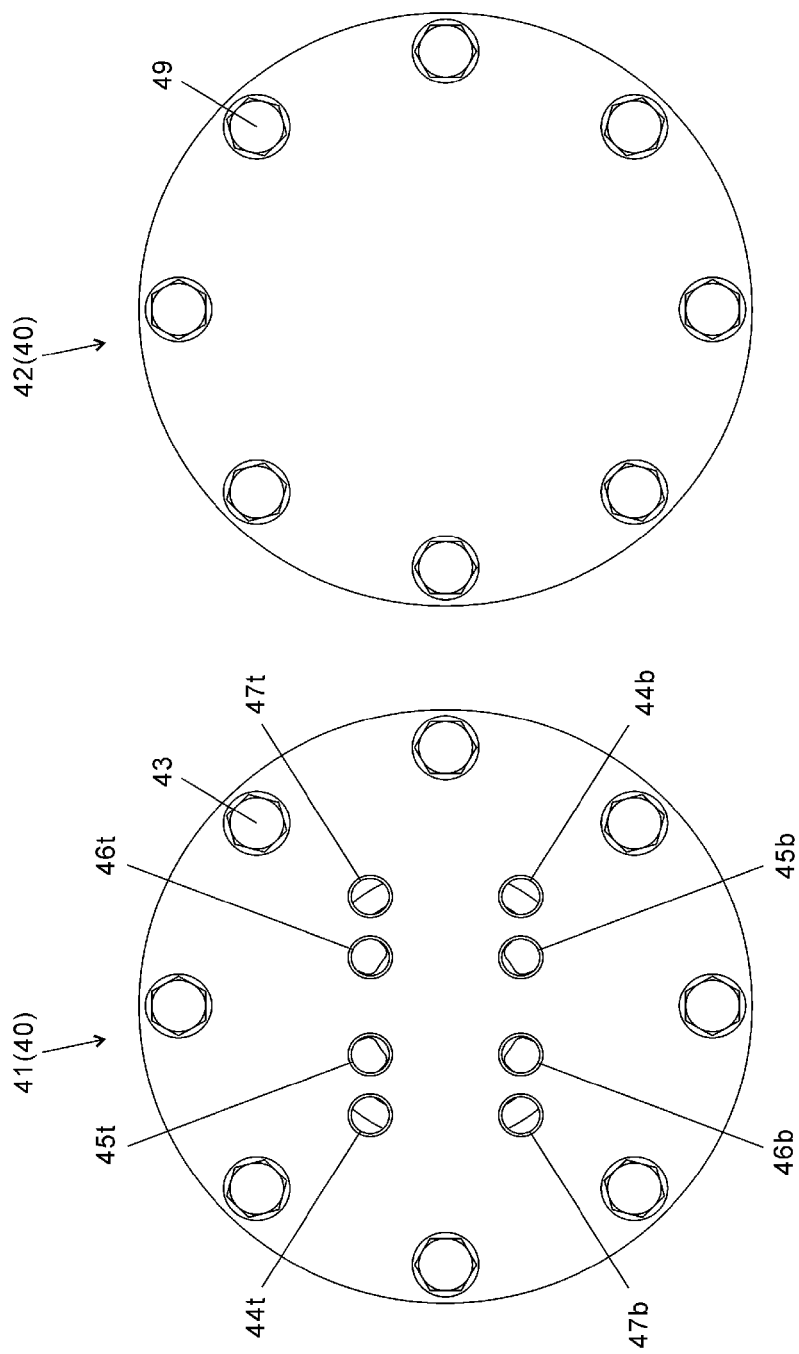
FIG. 7(a) is a front view of the pressure exchanger.
FIG. 7(b) is a rear view of the pressure exchanger.

As shown in FIG. 7(a), the pressed member 41 is provided in the thickness direction with water paths 44 (44t and 44b), 45 (45t and 45b), 46 (46t and 46b), and 47 (47t and 47b). The water paths 44 (44t and 44b), 45 (45t and 45b), 46 (46t and 46b), and 47 (47t and 47b) are fixed to the casing 11 and the first lateral member 20a by means of bolts 43 so as to be communicated with the first fluid inflow paths 14 (14t and 14b), the second fluid outflow paths 15(15t and 15b), the second fluid inflow paths 16 (16t and 16b), and the first fluid outflow paths 17 (17t and 17b), respectively, which are provided in the first lateral member 20a.

As shown in FIG. 7(b), the pressing member 42 has a pressing section 42a (See FIG. 2) projecting toward the second lateral member 20b. The pressing section 42a has a periphery fixed to the casing 11 by means of bolts 49 with a spacer 48 being interposed therebetween.

If the spacer is thinned or some of a plurality of spacer members are removed and fastened by means of the bolts 49, the pressing section 42a of the pressing member 42 presses the second lateral member 20b to slightly deform the second lateral member 20b. As a result, the gaps, which are provided respectively between the end surfaces 30a and 30b of the rotator 30 and the lateral members 20a and 20b, are decreased.

To the contrary, if the spacer is thickened or a larger number of spacer members are provided and fastened by means of the bolts 49, the spacer 48 moves the second lateral member 20b so as to be distant from the first lateral member 20a, thereby to increase the distance.

By pressing the second lateral member 20b with use of the press mechanism 40 to appropriately adjust the distance between the first lateral member 20a and the second lateral member 20b, it is possible to adjust the gaps between the lateral members 20a and 20b and the end surfaces 30a and 30b of the rotator 30, respectively.

There can be provided a similar press mechanism 40 close to the first lateral member 20a in addition to that close to the second lateral member 20b. The press mechanism 40 close to the first lateral member 20a can be configured to adjust the gaps respectively between the lateral members 20a and 20b and the end surfaces 30a and 30b of the rotator 30. Alternatively, the both press mechanisms 40 can be configured to adjust the gaps respectively between the lateral members 20a and 20b and the end surfaces 30a and 30b of the rotator 30.

If any one of the end surfaces of the rotator 30 slides with the corresponding lateral member and is abraded to increase the corresponding gap, at least one of the lateral members can be pressed by the press mechanism 40 so as to adjust the distance between the first lateral member 20a and the second lateral member 20b and adjust the flow rate of the fluid flowing into each of the gaps. Such adjustment prevents deterioration in pressure exchange efficiency. Still alternatively, the spacer can be configured by an elastic member so as to be adjusted in thickness by changing fastening strength with the bolts, or the thickness or elasticity of the elastic member can be changed so as to change the adjustment range of the gaps.

Described with reference to FIGS. 5(a) to 5(d) and 6 is specific pressure exchange treatment by the pressure exchanger 10 configured as described above.

Figure 6:
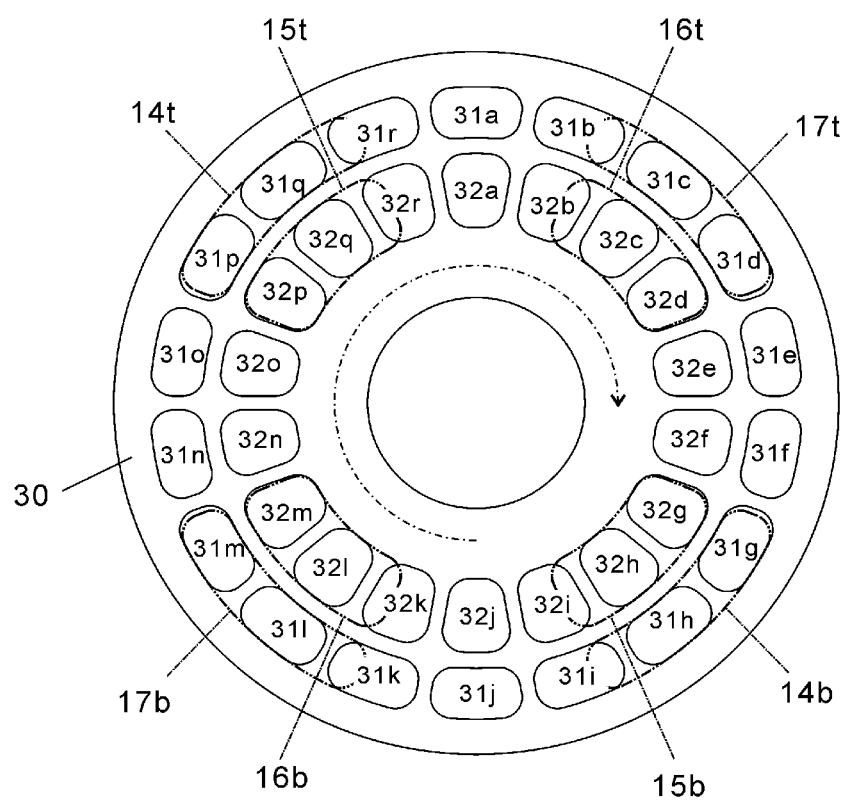
FIG. 6 is an explanatory view indicating positions of the flow paths formed in the rotator and the inflow paths and the outflow paths formed in the first lateral member.

As shown in FIG. 6, the rotator 30 is provided, radially around the rotation axis, with the 18 pressure transmission sections 33, more specifically, first flow paths 31a to 31r and second flow paths 32a to 32r. The regions indicated by two-dot chain lines in FIG. 6 correspond to the first fluid inflow paths 14t and 14b, the second fluid outflow paths 15t and 15b, the second fluid inflow paths 16t and 16b, and the first fluid outflow paths 17t and 17b provided in the first lateral member 20a.

When the rotator 30 is located at the position shown in FIGS. 5(a) to 5(d) and 6, the first fluid inflow path 14t is communicated simultaneously with the three adjacent first flow paths 31p, 31q, and 31r. The second fluid outflow path 15t is communicated simultaneously with the second flow paths 32p, 32q, and 32r. The first flow paths 31p, 31q, and 31r are communicated with the second flow paths 32p, 32q, and 32r in the rotator 30. The second fluid inflow path 16t is communicated simultaneously with the three adjacent second flow paths 32b, 32c, and 32d. The first fluid outflow path 17t is communicated with the first flow paths 31b, 31c, and 31d. The second flow paths 32b, 32c, and 32d are communicated with the first flow paths 31b, 31c, and 31d in the rotator 30.

Figures 5A, 5B:
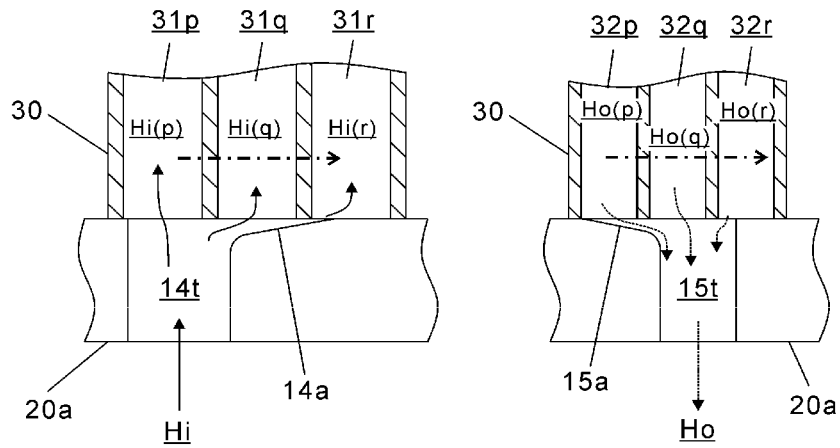
FIGS. 5(a) to 5(d) are explanatory views of inflow paths and outflow paths provided in the first lateral member and flow paths of the rotator.
Figures 5C, 5D:
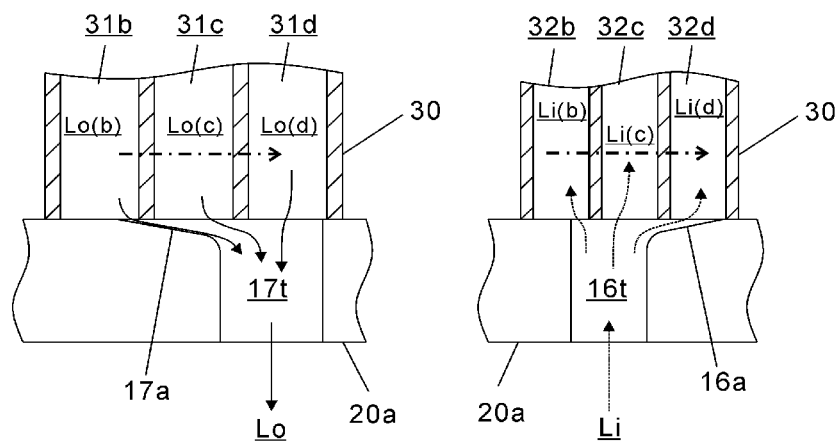

As shown in FIG. 5(a), the high pressure concentrated seawater Hi having flown into the first fluid inflow path 14t flows into the first flow paths 31p, 31q, and 31r as high pressure concentrated seawater Hi(p), Hi(q), and Hi(r), respectively.

The high pressure concentrated seawater Hi(q) and Hi(r) flows along the inclined surface 14a into the first flow paths 31q and 31r. At this time, as indicated by a dashed line arrow in FIG. 5(a), rightward force is applied to the rotator 30. In other words, as indicated by a dashed line arrow in FIG. 6, clockwise torque is applied to the rotator 30.

As shown in FIGS. 5(*a*) and 5(*b*), the high pressure concentrated seawater Hi(p) having flown from the first fluid inflow path 14*t* into the first flow path 31*p* transmits pressure to the seawater in the second flow path 32*p* communicated with the first flow path 31*p* and flows out of the second fluid outflow path 15*t* as high pressure seawater Ho(p).

The high pressure concentrated seawater Hi(q) having flown from the first fluid inflow path 14*t* into the first flow path 31*q* transmits pressure to the seawater in the second flow path 32*q* communicated with the first flow path 31*q* and flows out of the second fluid outflow path 15*t* as high pressure seawater Ho(q).

The high pressure concentrated seawater Hi(r) having flown from the first fluid inflow path 14*t* into the first flow path 31*r* transmits pressure to the seawater in the second flow path 32*r* communicated with the first flow path 31*r* and flows out of the second fluid outflow path 15*t* as high pressure seawater Ho(r).

When the high pressure seawater Ho(p), Ho(q), and Ho(r) flows out of the second fluid outflow path 15*t*, particularly, the high pressure seawater Ho(p) flows along the inclined surface 15*a*, so that the flow thereof is inhibited by the inclined surface 15*a*.

Accordingly, as indicated by a dashed line arrow in FIG. 5(*b*), water pressure presses an inner wall of the second flow path 32*p* to apply rightward force to the rotator 30. In other words, as indicated by a dashed line arrow in FIG. 6, clockwise torque is applied to the rotator 30.

As shown in FIG. 5(*d*), the low pressure seawater Li having flown into the second fluid inflow path 16*t* flows into the second flow paths 32*b*, 32*c*, and 32*d* as low pressure seawater Li(b), Li(c), and Li(d), respectively.

Particularly, the low pressure seawater Li(d) flows along the inclined surface 16*a* into the second flow path 32*d*. At this time, as indicated by a dashed line arrow in FIG. 5(*d*), rightward force is applied to the rotator 30. In other words, as indicated by a dashed line arrow in FIG. 6, clockwise torque is applied to the rotator 30.

As shown in FIGS. 5(*c*) and 5(*d*), the low pressure seawater Li(b) having flown from the second fluid inflow path 16*t* into the second flow path 32*b* transmits pressure to the seawater in the first flow path 31*b* communicated with the second flow path 32*b*, and flows out of the first fluid outflow path 17*t* as low pressure concentrated seawater Lo(b).

The low pressure seawater Li(c) having flown from the second fluid inflow path 16*t* into the second flow path 32*c* transmits pressure to the seawater in the first flow path 31*c* communicated with the second flow path 32*c*, and flows out of the first fluid outflow path 17*t* as low pressure concentrated seawater Lo(c).

The low pressure seawater Li(d) having flown from the second fluid inflow path 16*t* into the second flow path 32*d* transmits pressure to the seawater in the first flow path 31*d* communicated with the second flow path 32*d*, and flows out of the first fluid outflow path 17*t* as low pressure concentrated seawater Lo(d).

When the low pressure concentrated seawater Lo(b), Lo(c), and Lo(d) flows out of the first fluid outflow path 17*t*, the low pressure concentrated seawater Lo(b) and Lo(c) flows along the inclined surface 17*a*, so that the flow thereof is inhibited by the inclined surface 17*a*.

Accordingly, as indicated by a dashed line arrow in FIG. 5(*c*), water pressure presses inner walls of the first flow paths 31*b* and 31*c* to apply rightward force to the rotator 30. In other words, as indicated by the dashed line arrow in FIG. 6, clockwise torque is applied to the rotator 30.

As described above, the torque applied to the rotator 30 by the high pressure concentrated seawater Hi flowing from the first fluid inflow path 14*t* into the first flow paths 31, the torque applied to the rotator 30 by the high pressure seawater Ho flowing from the second flow paths 32 to the second fluid outflow path 15*t*, the torque applied to the rotator 30 by the low pressure seawater Li flowing from the second fluid inflow path 16*t* into the second flow paths 32, and the torque applied to the rotator 30 by the low pressure concentrated seawater Lo flowing from the first flow paths 31 to the first fluid outflow path 17*t* are all directed identically. As shown in FIG. 6, in the present embodiment, the rotator 30 rotates clockwise when viewed from the first lateral member 20*a*.

In this example, the high pressure seawater Ho is discharged from the second flow paths 32*p*, 32*q*, and 32*r* to the second fluid outflow path 15*t* by the pressure of the high pressure concentrated seawater Hi flowing from the first fluid inflow path 14*t* into the first flow paths 31*p*, 31*q*, and 31*r*, and the low pressure concentrated seawater Lo is discharged from the first flow paths 31*b*, 31*c*, and 31*d* to the first fluid outflow path 17*t* by the pressure of the low pressure seawater Li flowing from the second fluid inflow path 16*t* into the second flow paths 32*b*, 32*c*, and 32*d*. Similar pressure exchange is performed in each of the first flow paths 31*g*, 31*h*, 31*i*, 31*k*, 31*l*, and 31*m*, and the second flow paths 32*g*, 32*h*, 32*i*, 32*k*, 32*l*, and 32*m*, which are communicated with the first fluid inflow path 14*b*, the second fluid outflow path 15*b*, the second fluid inflow path 16*b*, and the first fluid outflow path 17*b*, respectively.

As described above, the rotation of the rotator 30 allows an arbitrary one of the first flow paths 31 and corresponding one of the second flow paths 32 paired to configure certain one of the pressure transmission sections 33 to communicate with one of the first fluid inflow paths 14 and corresponding one of the second fluid outflow paths 15 and then communicate with different one of the second fluid inflow paths 16 and corresponding one of the first fluid outflow paths 17. Accordingly, pressure is transmitted from the high pressure concentrated seawater Hi to the high pressure seawater Ho, and pressure is transmitted from the low pressure seawater Li to the low pressure concentrated seawater Lo, in a continuous manner. In other words, pressure is continuously exchanged between the first fluid and the second fluid.

In each of the first flow paths 31 and the second flow paths 32, concentrated seawater and seawater coexist. Because of a salinity difference therebetween, the concentrated seawater and the seawater merely form a boundary as a region where a certain amount is constantly mixed due to diffusion. This region serves like a piston and swings in the first flow path 31, the communication section, and the second flow path 32.

Pressure is not exchanged in the pairs of the first flow paths 31*a*, 31*e*, 31*f*, 31*j*, 31*n*, and 31*o* and the second flow paths 32*a*, 32*e*, 32*f*, 32*j*, 32*n*, and 32*o*, which are not communicated with any of the first fluid inflow paths 14, the second fluid outflow paths 15, the second fluid inflow paths 16, and the first fluid outflow paths 17, as shown in FIG. 6.

The present embodiment exemplifies the case where each of the first fluid inflow path 14*t*, the second fluid outflow path 15*t*, the second fluid inflow path 16*t*, and the first fluid outflow path 17*t* is communicated simultaneously with three flow paths. There is no limitation to the number of the flow paths to be communicated simultaneously. If the number of the flow paths to be communicated simultaneously is small and the number of the flow paths not communicated with any of the inflow paths and the outflow paths is large, water discharged from the device has larger pulsation.

The rotator 30 is rotated by the energy of the high pressure concentrated seawater Hi and the low pressure seawater Li flowing into the rotator 30, as well as by the energy of the high pressure seawater Ho and the low pressure concentrated seawater Lo flowing out of the rotator 30. It is thus possible to apply torque larger than that of the case of rotating the rotator 30 with use only of the energy of each fluid flowing thereinto.

When the shape of each of the inclined surfaces 14a, 15a, 16a, and 17a is changed, the fluid flowing from the inflow path into the flow paths and the fluid flowing from the flow paths to the outflow path flow in different directions. This changes magnitude of a velocity component of the fluid that applies torque to the rotator, thereby changing rotation speed of the rotator. In other words, the rotation speed of the rotator 30 is dependent on the shapes of the inclined surfaces 14a, 15a, 16a, and 17a. The flow rate treated by the pressure exchanger is dependent on the rotation speed of the rotator 30. It is thus possible to easily adjust the treated flow rate of the pressure exchanger by changing the shapes and adjusting the rotation speed of the rotator 30. If there are prepared first lateral members having different shapes, the treated flow rate can be easily adjusted by replacing the first lateral member.

As described above, the first lateral member 20a is provided with the first fluid inflow paths 14t and 14b, the first fluid outflow paths 17t and 17b, the second fluid inflow paths 16t and 16b, and the second fluid outflow paths 15t and 15b. The first fluid or the second fluid is caused to flow from the first end of the rotator 30 to the pressure transmission sections. Pressure is exchanged between the first fluid and the second fluid in the rotator 30. The second fluid or the first fluid is caused to flow out of the first end.

Accordingly, when performing pressure exchange treatment at a same flow rate, in comparison to a pressure transmission section that is configured by a straight pipe having an inflow path and an outflow path at respective ends as in a conventional pressure exchanger, the rotator has a shorter axial length even though performing pressure exchange treatment at the same flow rate, thereby to achieve reduction in size and cost of the device. Even if the flow rate of the pressure exchange treatment needs to be increased, such a shorter axial length of the rotator prevents extreme increase in size of the device.

Furthermore, the first fluid inflow and outflow paths and the second fluid inflow and outflow paths are provided only in the first lateral member 20a, so that piping connected with the inflow path or the outflow path of each fluid can be collectively provided in the first lateral member 20a. As compared with a conventional case where piping connected with an inflow path or an outflow path of fluid is provided at each end of the rotator, workability of piping installation work, maintenance work, and the like is improved.

In other words, the piping is collectively provided in the first lateral member 20a, so that the installation space including the piping is reduced. Furthermore, without removing the piping, maintenance work can be performed from the side of the second lateral member 20b provided with no piping. This improves maintenance performance.

In the above embodiment, the bushes 13 are provided to the rotary shaft of the rotator 30 so as to reduce misalignment of the axis of the rotator 30 and achieve smooth rotation. However, the bushes 13 are not necessarily provided. In the case where the bushes 13 are not provided, the sleeve 12 rotatably supports the rotator 30.

In the above embodiment, the first flow paths 31 and the second flow paths 32 are provided to have same sectional areas, so as to reduce excessive pressure loss due to change in sectional area of the flow paths. Alternatively, the first flow paths 31 and the second flow paths 32 can have sectional areas different from each other.

In the above embodiment, the first flow paths 31 are communicated with the second flow paths 32 at the second end surface 30b of the rotator 30. Alternatively, these flow paths can be communicated with each other at positions displaced by a predetermined distance from the end surface 30b toward the end surface 30a. In other words, the communication sections can be located at any positions between the end surface 30a and the end surface 30b.

The first flow paths 31 and the second flow paths 32 are not necessarily communicated with each other in the rotator 30. Alternatively, a member rotating integrally with the rotator 30 can be provided between the second lateral member 20b and the rotator 30 and the rotating member can be provided with recesses facing the inflow paths and the outflow paths, so that the first flow paths 31 and the second flow paths 32 can be communicated with each other by way of the recesses as the rotator rotates.

The shapes of the first flow paths 31 and the second flow paths 32 are not limited to those shown in FIG. 3(a). Alternatively, the first flow paths and the second flow paths can have circular shapes such as perfect circles or ellipses, or polygonal shapes such as triangles or quadrangles in cross-section. By changing the numbers or the sectional shapes of the first flow paths 31 and the second flow paths 32, the total sectional areas of the pressure transmission sections 33 can be changed, so as to change the flow rate treated by the pressure exchanger 10. As shown in FIG. 3(a), the sectional shapes having a large aperture ratio with respect to the cross section of the rotator is most preferred.

In the above embodiment, the sleeve 12 and the second lateral member 20b are provided separately from each other. Alternatively, the sleeve 12 and the second lateral member 20b can be formed integrally into a cup shape, so that the rotator 30 is located in the space closed by the first lateral member 20a. In this case, the casing 11 can be removed optionally.

In the above embodiment, there are provided the first fluid inflow paths 14t and 14b, the second fluid outflow paths 15t and 15b, the second fluid inflow paths 16t and 16b, and the first fluid outflow paths 17t and 17b, in other words, the inflow paths in a pair for each type and the outflow paths in a pair for each type, more specifically, two each. Alternatively, there can be provided one inflow path for each type and one outflow path for each type, or there can be provided three or more inflow paths for each type and three or more outflow paths for each type.

If there are provided a plurality of inflow paths and a plurality of outflow paths, the inflow paths and the outflow paths are preferably located so as to be point symmetrical around the rotation axis, in view of pressure balance between the fluid flowing into the rotator 30 and the fluid flowing out of the rotator 30.

The above embodiment exemplifies the torque application mechanism that applies torque to the rotator 30 with use of the energy of the concentrated seawater flowing into the first flow paths 31 or flowing out of the first flow paths 31 as well as the energy of the seawater flowing into the second flow paths 32 or flowing out of the second flow paths 32.

The configuration of the torque application mechanism is not limited to this, but can be alternatively configured to apply torque to the rotator 30 with use of at least one of the energy of the concentrated seawater flowing into the first flow paths 31 or flowing out of the first flow paths 31 and the energy of the seawater flowing into the second flow paths 32 or flowing out of the second flow paths 32.

When utilizing either energy only, the torque application mechanism can be configured to apply torque to the rotator 30 with use of the energy of the high pressure concentrated seawater Hi flowing into the first flow paths 31 so as to achieve higher energy efficiency, because the first flow paths 31 are located radially outside the second flow paths 32 in the rotator 30.

Described below is a pressure exchanger according to another embodiment of the present invention. The configurations similar to those in the above embodiment are denoted by the same reference signs and will not be described repeatedly.

Figure 8:
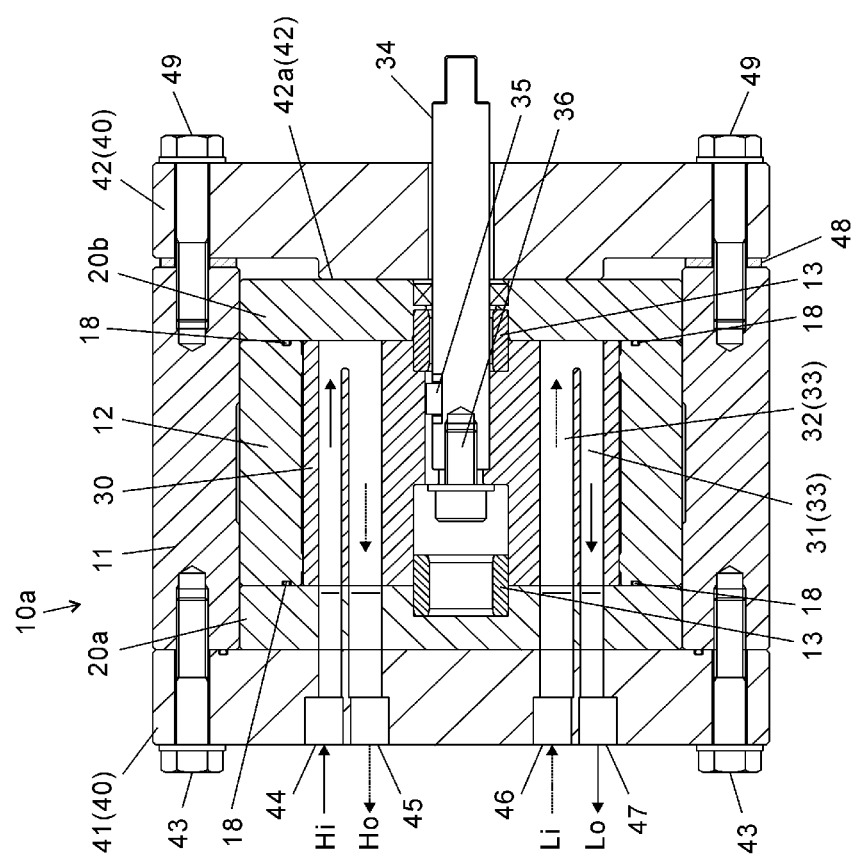
FIG. 8 is an explanatory view of a pressure exchanger according to another embodiment.

As shown in FIG. 8, a pressure exchanger 10a can be configured to rotate the rotator 30, which is coupled with a drive shaft 34, with use of external power of a driving machine or the like. The drive shaft 34 can be inserted from openings provided in the pressing member 42 and the second lateral member 20b and fixed to the rotator 30 by means of a key 35 and a bolt 36 so as to be rotated integrally. Even in a case where the rotator 30 is not rotated stably due to an inconstant flow of the fluid or the like, the external power of the driving machine or the like coupled to the drive shaft 34 can drive to rotate the rotator 30 and achieve stable rotation, which improves reliability of the device.

Figure 9:
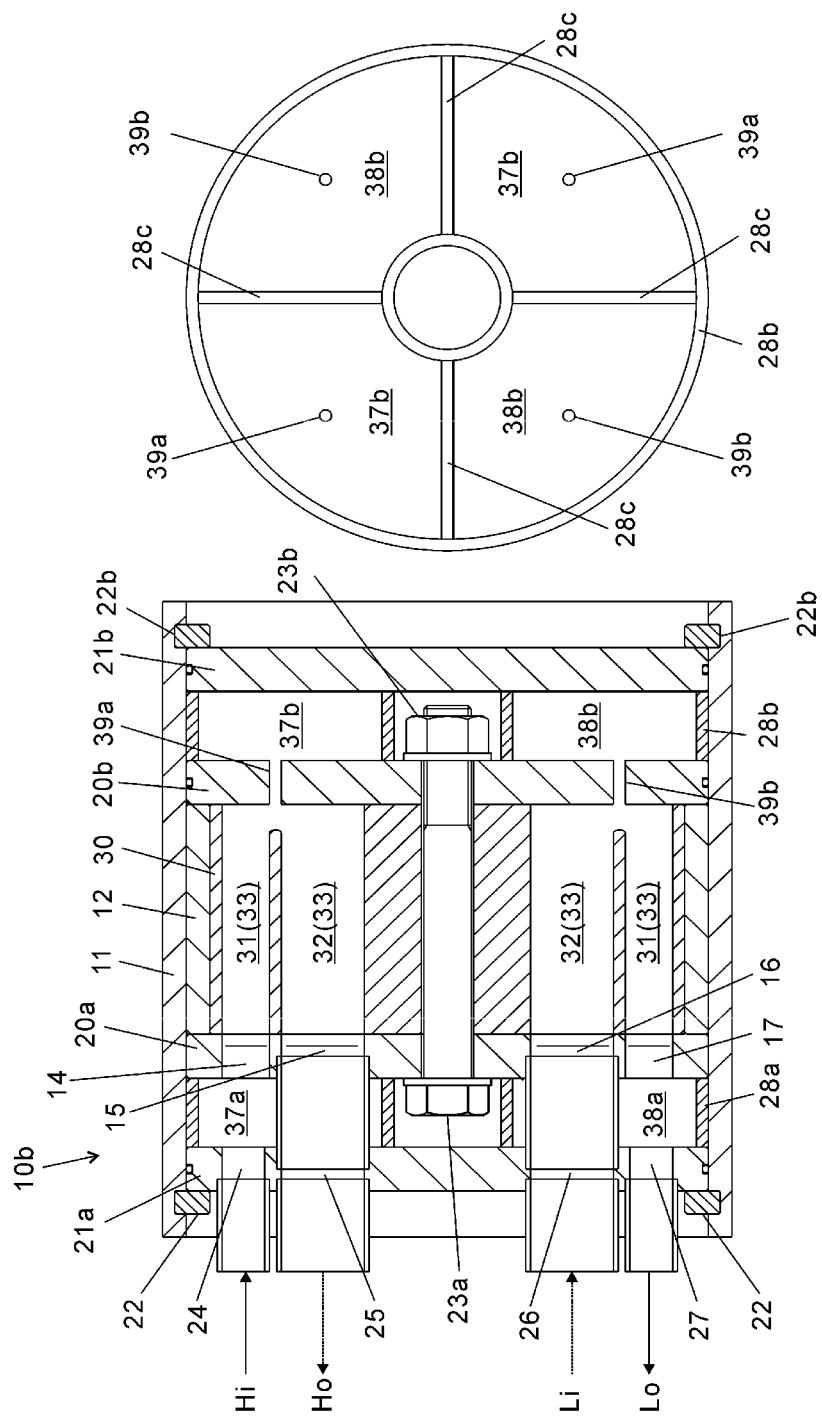
FIG. 9(a) is an explanatory view of a pressure exchanger according to still another embodiment.
FIG. 9(b) is an explanatory view of a main portion of the pressure exchanger.

Still another embodiment is described below. As shown in FIG. 9(a), a pressure converter 10b includes the rotator 30 that is accommodated in the space defined by the casing 11, the first lateral member 20a, the second lateral member 20b, and the sleeve 12 sandwiched between the lateral members 20a and 20b, and is supported so as to be rotatable about a bolt 23a.

The bolt 23a and a nut 23b function as a press mechanism that is capable of adjusting the distance between the first lateral member 20a and the second lateral member 20b by adjusting fastening states of the bolt 23a and the nut 23b.

The first lateral member 20a is provided, in the thickness direction thereof, with the first fluid inflow path 14 for guiding the high pressure concentrated seawater Hi to the first flow paths 31, the second fluid outflow path 15 for guiding the high pressure seawater Ho after pressure exchange with the high pressure concentrated seawater Hi from the second flow paths 32, the second fluid inflow path 16 for guiding the low pressure seawater Li to the second flow paths 32, and the first fluid outflow path 17 for guiding the low pressure concentrated seawater Lo after pressure exchange with the low pressure seawater Li from the first flow paths 31.

There is provided an end cover 21a on the left side of the first lateral member 20a with a partition member 28a being interposed therebetween. The end cover 21a is fixed by ring members 22a so as not to be disengaged leftward from the casing 11.

The end cover 21a is provided, in the thickness direction thereof, with water paths 24, 25, 26, and 27 that are communicated respectively with the first fluid inflow path 14, the second fluid outflow path 15, the second fluid inflow path 16, and the first fluid outflow path 17 provided in the first lateral member 20a.

There is provided an end cover 21b on the right side of the second lateral member 20b with a partition member 28b being interposed therebetween. The end cover 21b is fixed by ring members 22b so as not to be disengaged rightward from the casing 11.

The partition member 28a is configured to keep the distance between the first lateral member 20a and the end cover 21a so as to be equal to the distance defined by the thickness of the partition member 28a. The partition member 28a is further configured such that the first fluid inflow path 14 and the water path 24 are communicated with each other, the second fluid outflow path 15 and the water path 25 are communicated with each other, the second fluid inflow path 16 and the water path 26 are communicated with each other, and the first fluid outflow path 17 and the water path 27 are communicated with each other.

The space between the first fluid inflow path 14 and the water path 24, which is defined by the first lateral member 20a, the end cover 21a, and the partition member 28a, serves as a press space 37a into which the high pressure concentrated seawater Hi flows. The press space 37a between the first fluid inflow path 14 and the water path 24 also serves as a continuous hole.

The high pressure concentrated seawater Hi, which proceeds from the water path 24 to the first fluid inflow path 14, flows into the press space 37a. The pressure of the high pressure concentrated seawater Hi is applied to press the first lateral member 20a toward the rotator 30.

The space between the first fluid outflow path 17 and the water path 27, which is defined by the first lateral member 20a, the end cover 21a, and the partition member 28a, serves as a press space 38a into which the low pressure concentrated seawater Lo flows. The press space 38a between the first fluid outflow path 17 and the water path 27 also serves as a continuous hole.

The low pressure concentrated seawater Lo, which proceeds from the first fluid outflow path 17 to the water path 27, flows into the press space 38a. The pressure of the low pressure concentrated seawater Lo is applied to press the first lateral member 20a toward the rotator 30.

The partition member 28b is configured to keep the distance between the second lateral member 20b and the end cover 21b so as to be equal to the distance defined by the thickness of the partition member 28b.

In the space defined by the second lateral member 20b, the end cover 21b, and the partition member 28b, the space provided at positions corresponding to the first fluid inflow path 14 and the second fluid outflow path 15 serves as a press space 37b into which mixture fluid of the high pressure concentrated seawater Hi and the high pressure seawater Ho in the pressure transmission sections 33 flows.

The second lateral member 20b is provided with a continuous hole 39a, and the mixture fluid of the high pressure concentrated seawater Hi and the high pressure seawater Ho in the pressure transmission sections 33 flows through the continuous hole 39a into the press space 37b. The pressure of the mixture fluid is applied to press the second lateral member 20b toward the rotator 30.

In the space defined by the second lateral member 20b, the end cover 21b, and the partition member 28b, the space provided at positions corresponding to the second fluid inflow path 16 and the first fluid outflow path 17 serves as a press space 38b into which mixture fluid of the low pressure seawater Li and the low pressure concentrated seawater Lo in the pressure transmission sections 33 flows.

The second lateral member 20b is provided with a continuous hole 39b, and the mixture fluid of the low pressure seawater Li and the low pressure concentrated seawater Lo in the pressure transmission sections 33 flows through the continuous hole 39b into the press space 38b. The pressure of the mixture fluid is applied to press the second lateral member 20b toward the rotator.

As shown in FIG. 9(b), there are provided partition walls 28c in the space defined by the second lateral member 20b, the end cover 21b, and the partition member 28b, so as to partition the press spaces 37b and 38b, respectively.

Alternatively, the second lateral member 20b can be provided without the continuous hole 39b but only with the continuous hole 39a and the partition walls 28c are not provided, so that only the mixture fluid of the high pressure concentrated seawater Hi and the high pressure seawater Ho flows through the continuous hole 39a into the space defined by the second lateral member 20b, the end cover 21b, and the partition member 28b, and the space thus serves as the press space 37b.

The first lateral member 20a and the second lateral member 20b are fastened at the centers by the bolt 23a and the nut 23b, so that the fluid in the rotator 30 applies axially outward pressure to the surfaces of the first lateral member 20a and the second lateral member 20b facing the rotator 30.

As described above, however, the fluid to be supplied to each of the first flow paths 31 and the second flow paths 32 is guided into corresponding one of the press spaces 37a and 38a located outside the first lateral member 20a, and the fluid in each of the first flow paths 31 and the second flow paths 32 is guided through the continuous holes 39a and 39b provided in the second lateral member 20b into the press spaces 37b and 38b located outside the second lateral member 20b.

The fluid having pressure same as that in each of the flow paths 31 and 32 is guided into each of the press spaces 37a, 37b, 38a, and 38b. It is possible to prevent deformation of the first lateral member 20a and the second lateral member 20b along the rotation axis because the force applied to each of the surfaces of the first lateral member 20a and the second lateral member 20b is balanced.

Figure 10:
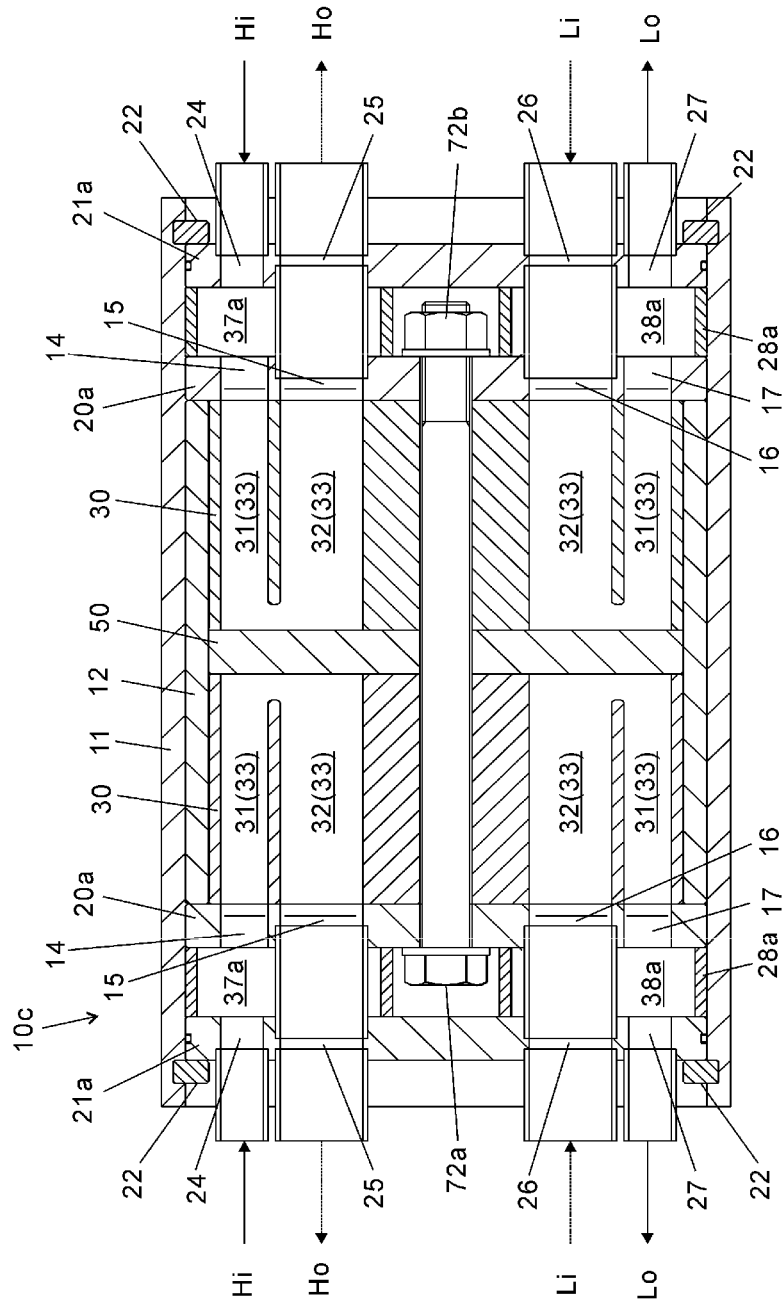
FIG. 10 is an explanatory view of a pressure exchanger according to further another embodiment.

Further another embodiment is described below. The configurations similar to those in the pressure exchanger 10b according to the still other embodiment are denoted by the same reference signs and will not be described repeatedly. As shown in FIG. 10, a pressure exchanger 10c is provided at the center of the sleeve 12 with a fixed plate 50. The first lateral members 20a, the end covers 21a, the partition members 28a, and the rotators 30 are provided so as to be bilaterally symmetrical with respect to the longitudinal center line of the fixed plate 50.

Force of mixture fluid of the high pressure concentrated seawater Hi and the high pressure seawater Ho and force of mixture fluid of the low pressure seawater Li and the low pressure concentrated seawater Lo are applied to respective surfaces of the fixed plate 50. A space located at a first side surface of the fixed plate 50 serves as a press space for a space located at a second side surface, while the space located at the second side surface serves as a press space for the first side surface. There is no need to provide the continuous holes 39a and 39b as in the press spaces 37b and 38b shown in FIGS. 9(a) and 9(b).

Figure 11:
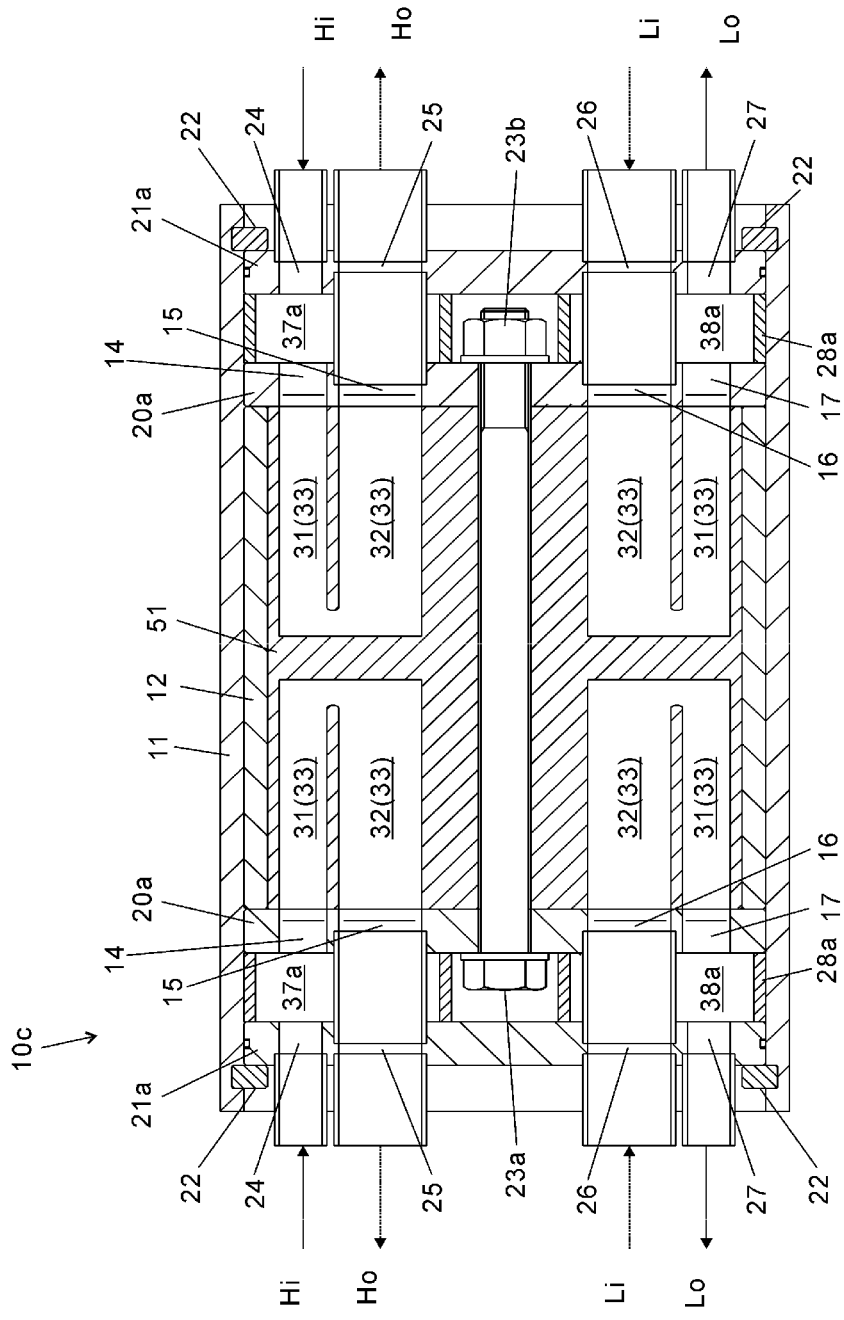
FIG. 11 is an explanatory view of a pressure exchanger according to a further different embodiment.
Figure 12:
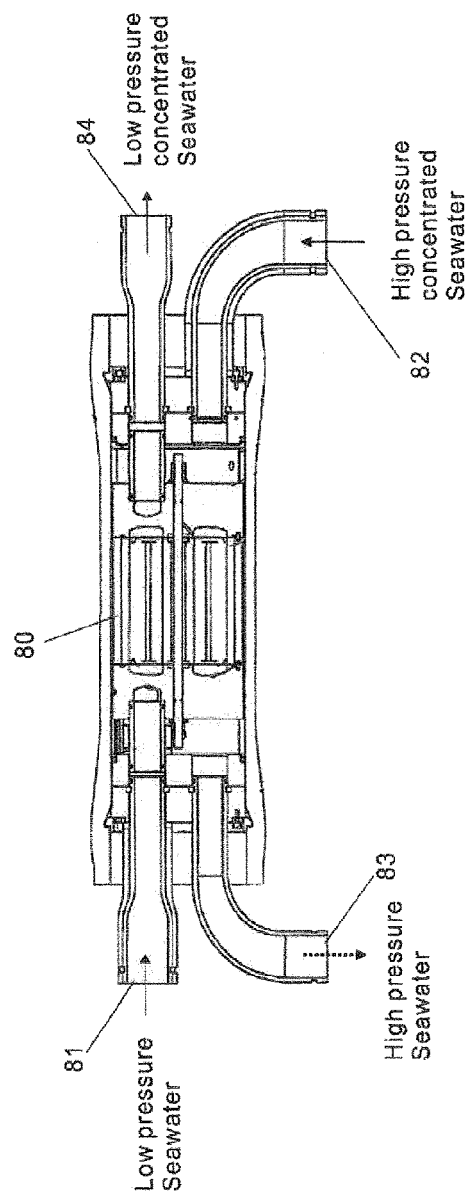
FIG. 12 is an explanatory view of a conventional pressure exchanger.
Figure 13:
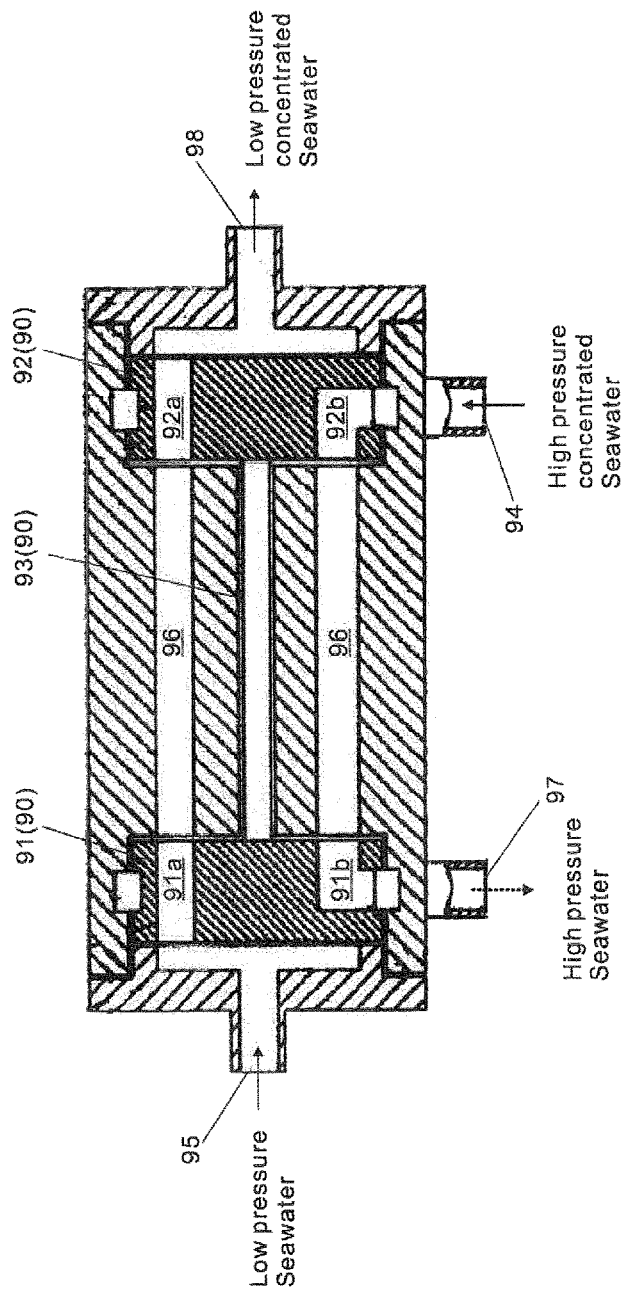
FIG. 13 is an explanatory view of another conventional pressure exchanger.

Alternatively, without providing the fixed plate 50 in the sleeve 12, there can be provided a rotator 51 (see FIG. 11) that is obtained by integrally forming the right and left rotators 30.

In any one of the above embodiments, the torque application mechanism is configured to have the inclined surfaces on the first lateral member. Alternatively, in addition to or in place of the inclined surfaces provided on the first lateral member, the first flow paths or the second flow paths can be provided so as to be circumferentially inclined in the rotator, so that the first fluid flowing into the first flow paths or the second fluid flowing into the second flow paths comes into contact with the wall surfaces of the first flow paths or the second flow paths and thus applies torque to the rotator.

If portions, through which the first fluid and the second fluid flows, such as ends of the first flow paths and the second flow paths provided in the rotator and ends of the inflow paths and the outflow paths provided in the first lateral member, are chamfered, rounded at corners, or the like, it is possible to reduce pressure loss and thus prevent cavitation or generation of pulsation.

Any one of the above embodiments exemplifies the configuration in which the high pressure concentrated seawater flows into the first fluid inflow path and the low pressure seawater as the concentration target fluid flows into the second fluid inflow path. Alternatively, the low pressure seawater as the concentration target fluid can flow into the first fluid inflow path and the high pressure concentrated seawater can flow into the second fluid inflow path.

The specific configurations of the pressure exchanger and the performance adjustment method of the pressure exchanger having been described are not limited to these embodiments, but can be obviously modified in design appropriately within the scope in which the functional effects of the present invention are exerted.

DESCRIPTION OF SYMBOLS

6: Reverse osmosis membrane device
10: Pressure exchanger
11: Casing
12: Sleeve
13: Bush
14: First fluid inflow path
15: Second fluid outflow path
16: Second fluid inflow path
17: First fluid outflow path
14a, 17a: Inclined surface (First inclined section)
15a, 16a: Inclined surface (Second inclined section)
20a: First lateral member
20b: Second lateral member
30: Rotator
31: First flow path
32: Second flow path
33: Pressure transmission section
34: Drive shaft
37a, 37b: Press space
38a, 38b: Press space
39a, 39b: Continuous hole
40: Press mechanism
Hi: High pressure concentrated seawater
Li: Low pressure seawater
Ho: High pressure seawater
Lo: Low pressure concentrated seawater

The invention claimed is:

1. A pressure exchanger for exchanging pressures between a first fluid and a second fluid, the pressure exchanger comprising:

a rotator having, around a rotation axis, a pressure transmission section provided such that a first flow path into or out of which the first fluid flows from a first end of the rotator is communicated with a second flow path into or out of which the second fluid flows from a first end of the rotator;

a first lateral member provided, in a thickness direction along the rotation axis, with a first fluid inflow path for guiding the first fluid to the first flow path, a second fluid outflow path for guiding the second fluid after the exchanging of pressures from the second flow path, a second fluid inflow path for guiding the second fluid to the second flow path, and a first fluid outflow path for guiding the first fluid after the exchanging of pressures from the first flow path; and a second lateral member, wherein the rotator is rotatably sandwiched between the first lateral member and the second lateral member, with a retentive member being interposed therebetween, wherein the rotator is accommodated in a space defined by the first and second lateral members, and the retentive member is sandwiched between the lateral members, the first flow path and the second flow path pass through the rotator, and gaps into which the first fluid and the second fluid flow are provided between the rotator and the first and second lateral members, respectively, and wherein the first and second lateral members are provided outside the rotator with press spaces pressing the lateral members toward the rotator, and the first and second lateral members are provided with continuous holes for guiding at least one of the first fluid and the second fluid supplied to the first flow path or the second flow path into the press spaces.

2. The pressure exchanger according to claim 1, wherein a press mechanism presses against at least one of the lateral members on a side opposite of the rotator to adjust a distance between the first and second lateral members.

3. The pressure exchanger according to claim 1, wherein the rotator is provided with a plurality of pressure transmission sections radially around the rotation axis.

4. The pressure exchanger according to claim 3, wherein the plurality of pressure transmission sections are adjacent and communicated simultaneously with at least each one of the first fluid inflow path and the second fluid outflow path, or each one of the second fluid inflow path and the first fluid outflow path, as the rotator rotates.

5. The pressure exchanger according to claim 3, wherein at least one of the plurality of pressure transmission sections is not communicated with the first fluid inflow path and the second fluid outflow path, and with the first fluid outflow path and the second fluid inflow path, as the rotator rotates.

6. The pressure exchanger according to claim 1, wherein the first lateral member is provided with the first fluid inflow path comprising a plurality of sets of first fluid inflow paths and the second fluid outflow path comprising a plurality of second fluid outflow paths symmetrically arranged around the rotation axis.

7. The pressure exchanger according to claim 1, wherein the first flow path and the second flow path have equal cross-sectional areas in a plane perpendicular to a direction of a flow for the first or second fluid therein.

8. The pressure exchanger according to claim 1, wherein the rotator is coupled with a drive shaft for rotating the rotator with use of external power.

9. The pressure exchanger according to claim 1, wherein the first fluid supplied to the first fluid inflow path corresponds to a high pressure concentrated fluid discharged from a reverse osmosis membrane device, and the second fluid supplied to the second fluid inflow path corresponds to a concentration target fluid supplied to the reverse osmosis membrane device.

10. A pressure exchanger for exchanging pressures between a first fluid and a second fluid, the pressure exchanger comprising:

a rotator having, around a rotation axis, a pressure transmission section provided such that a first flow path into or out of which the first fluid flows from a first end of the rotator is communicated with a second flow path into or out of which the second fluid flows from a first end of the rotator;

a first lateral member provided, in a thickness direction along the rotation axis, with a first fluid inflow path for guiding the first fluid to the first flow path, a second fluid outflow path for guiding the second fluid after the exchanging of pressures from the second flow path, a second fluid inflow path for guiding the second fluid to the second flow path, and a first fluid outflow path for guiding the first fluid after the exchanging of pressures from the first flow path;

a second lateral member, wherein the rotator is rotatably sandwiched between the first lateral member and the second lateral member, with a retentive member being interposed therebetween; and a torque application mechanism provided at the first lateral member, for applying a torque to the rotator with use of energy of the first fluid flowing into the first flow path or flowing out of the first flow path, or energy of the second fluid flowing into the second flow path or flowing out of the second flow path.

11. The pressure exchanger according to claim 10, wherein the torque application mechanism includes:

a first inclined section provided on a surface of the first fluid inflow path opposite to the rotator, so as to be circumferentially expanded and communicated with a plurality of first flow paths along a circumferential direction of the rotator; and a second inclined section provided on a surface of the second fluid outflow path opposite to the rotator, so as to be circumferentially expanded and communicated with a plurality of second flow paths along the circumferential direction of the rotator; and the first inclined section and the second inclined section are inclined inversely to each other.

12. A performance adjustment method of the pressure exchanger according to claim 10, the method comprising the steps of:

preparing a plurality of other torque application mechanisms for applying torques each having a different value; and adjusting a rotation speed of the rotator to adjust a treated flow rate by replacing the torque application mechanism with one of the plurality of other torque application mechanisms.

* * * * *

UNITED STATES PATENT AND TRADEMARK OFFICE
CERTIFICATE OF CORRECTION

PATENT NO. : 9,328,743 B2  
APPLICATION NO. : 13/979250  
DATED : May 3, 2016  
INVENTOR(S) : Yoshifumi Hirosawa et al.

Page 1 of 1

It is certified that error appears in the above-identified patent and that said Letters Patent is hereby corrected as shown below:

In the claims,

Column 22, Line 57, Claim 1, delete "a" and insert -- the --

Column 24, Line 8, Claim 10, delete "a" and insert -- the --

Signed and Sealed this
Twenty-sixth Day of July, 2016

Michelle K. Lee
*Director of the United States Patent and Trademark Office*